United States Patent [19]
Oliveira et al.

[11] Patent Number: 5,880,578
[45] Date of Patent: Mar. 9, 1999

[54] POWER CONTROL UNIT

[75] Inventors: Daniel Oliveira, Soultz; David Isner, Brunstatt; Haruo Nishiyama, Colmar, all of France; Hiranaga Yamamoto, Nara, Japan

[73] Assignee: Sharp Kabushiki Kaisha, Osaka, Japan

[21] Appl. No.: 926,453

[22] Filed: Sep. 10, 1997

[30] Foreign Application Priority Data

Jul. 4, 1997 [EP] European Pat. Off. .............. 97401604

[51] Int. Cl.$^6$ ................................ G05F 1/10; G05F 5/00
[52] U.S. Cl. ............................................. 323/235; 323/300
[58] Field of Search .................................... 323/235, 236, 323/237, 238, 300; 363/49; 315/307

[56] References Cited

U.S. PATENT DOCUMENTS

| | | |
|---|---|---|
| 4,328,459 | 5/1982 | McLeod, Jr. . |
| 5,030,890 | 7/1991 | Johnson . |
| 5,079,409 | 1/1992 | Takada et al. ............................ 323/235 |
| 5,481,089 | 1/1996 | Furuta ...................................... 323/235 |
| 5,483,149 | 1/1996 | Barrett ...................................... 323/300 |
| 5,747,972 | 5/1998 | Baretich et al. .......................... 323/223 |
| 5,796,245 | 8/1998 | Beaulieu et al. ......................... 323/237 |

FOREIGN PATENT DOCUMENTS

| | | |
|---|---|---|
| 2667754 | 4/1992 | France . |
| 2726405 | 10/1994 | France . |
| 6242644A | 9/1994 | Japan . |

*Primary Examiner*—Stuart N. Hecker

[57] ABSTRACT

In a power control unit for controlling a power supply to a load connected to an AC power source by switching on half cycles, following three modes are carried out in the order of presented: a first control mode for continuously supplying a power which is composed of a plurality of half cycle switching waveforms of a first polarity to said load; a second control mode for continuously supplying a power which is composed of a plurality of half cycle switching waveforms of a second polarity to said load, said second polarity being different from said first polarity; and a third control mode for supplying a power of a half cycle of said first polarity and a power of a half cycle of said second polarity to said load in turn. This arrangement can attain an effect that both the harmonic noises and the flickers caused by a rush current are reduced.

22 Claims, 15 Drawing Sheets

F I G. 2
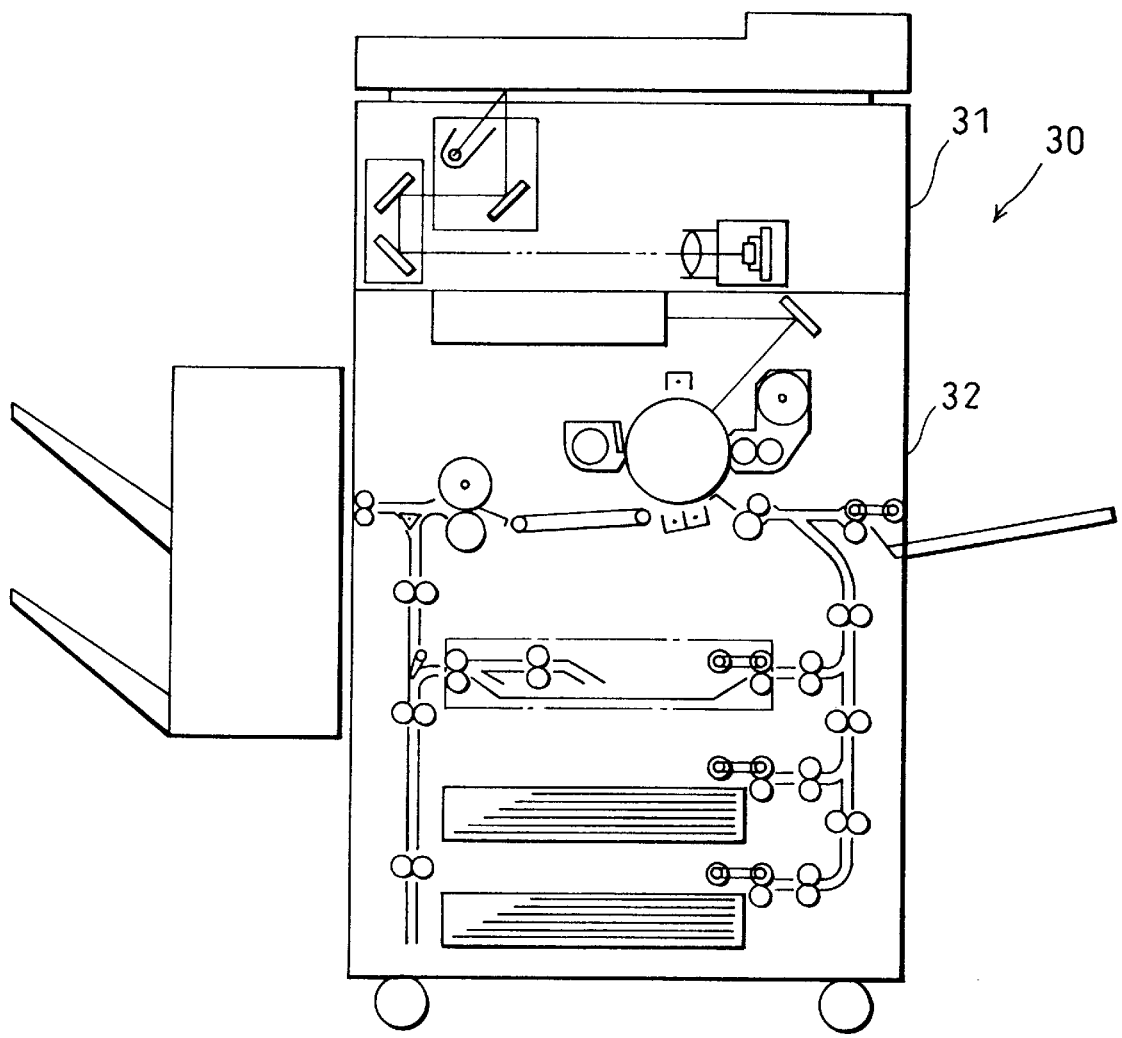

Td: DELAY

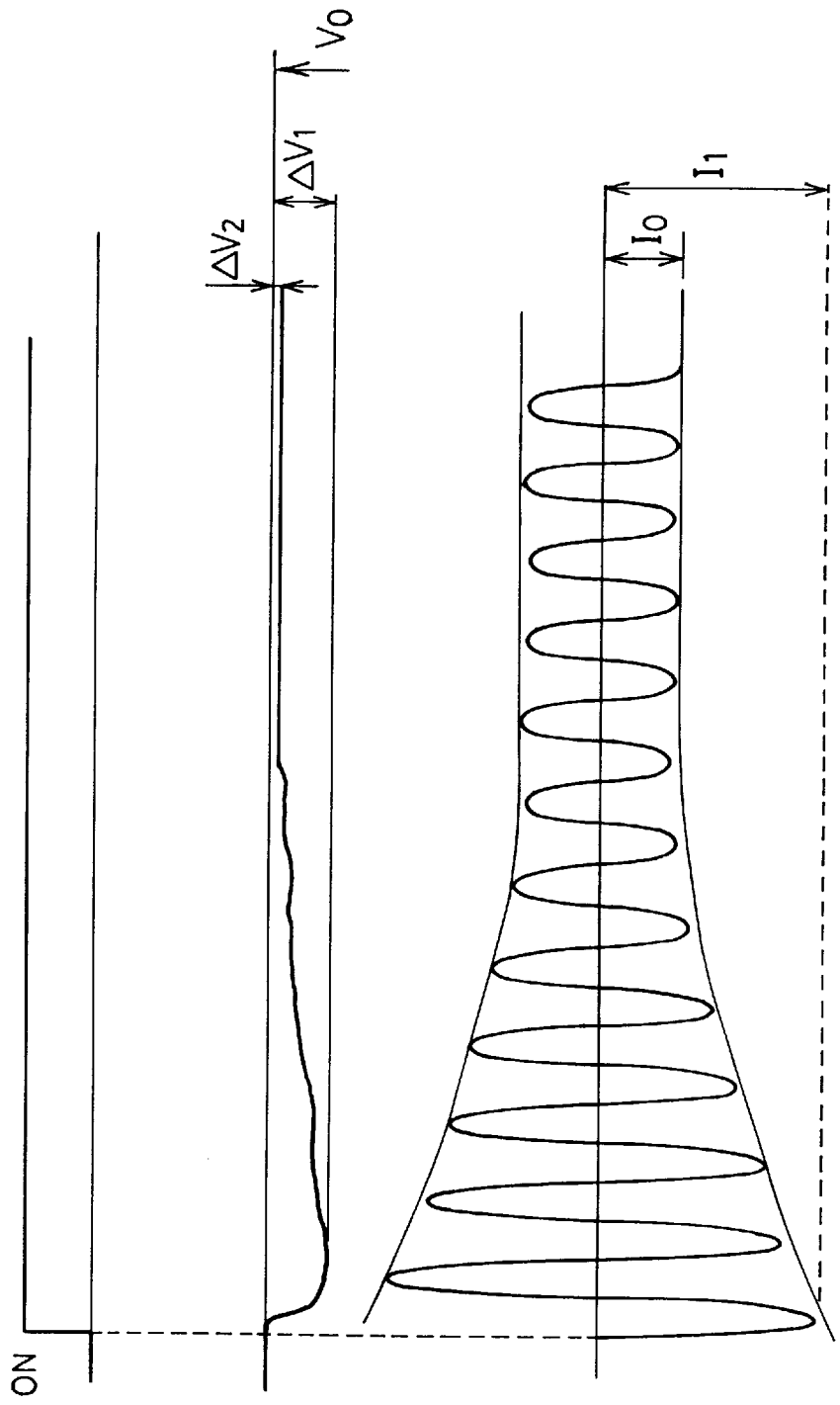

POWER CONTROL UNIT

FIELD OF THE INVENTION

The present invention relates to a power control unit for controlling a power supply to a load like a heater of a thermal fuser provided in an image forming apparatus, such as a copying machine, a printer and a facsimile machine. More particularly, the present invention relates to a power control unit which reduces harmonic components generated by a temporal drop of a power source voltage (flickers) caused by a rush current flowing into the load or an instantaneous phase control (switching) of the power source at the start of the power supply.

BACKGROUND OF THE INVENTION

For example, in an image forming apparatus, such as an electrophotographic copying machine, a printer, and a facsimile machine, an image on an original document is converted into an electric image signal in accordance with a density of image information, based on which an electrostatic latent image is formed on a photosensitive body using a laser beam or the like. Then, the electrostatic latent image is developed into a developer image and transferred onto a sheet, after which the developer image is fused with heat generated by a heater of a thermal fuser to be fixed thereon. The heater (hereinafter, referred to as fusing heater) of the thermal fuser is provided as a load. A heater lamp, such as a halogen lamp, is used as the fusing heater, and a heating resistor or the like is used as a heat source. The fusing heater is provided inside a pair of fusing rollers for nipping and transporting a sheet on which the developer image is to be fused. More specifically, one or more than one fusing heater each having a power ranging from some hundreds Watts to approximately two thousands Watts is provided inside either or both of the pair of fusing rollers. In case of a high-speed image forming apparatus, a fusing heater having a larger capacity is used. Further, the pair of fusing rollers are kept at a predetermined temperature by controlling a power supplied to the fusing heater using a fusing heater's ON/OFF signal which is generated based on a detection result of a temperature sensor provided in such a manner to touch the surface of the pair of fusing rollers.

When the image forming apparatus has a large load to which a power is supplied under control, a large rush current passes through the load at the moment the power supply begins. In the following, how the power source voltage drops as a large current passes through the load will be explained using a halogen heater of the fuser as an example and with reference to FIG. 15. As indicated by a curve (a), when a heater signal comes ON state, a power is supplied to the halogen heater from a commercial power source. Since a resistance value of the halogen heater varies with its own temperature, if a current has not been supplied to the same, the halogen heater has quite a small resistance value, generally $1/10$ of a resistance value when heated. When a power is supplied to the halogen heater having a small resistance value, a rush current $I_1$ flows into the halogen heater as soon as the power is supplied as indicted by a curve (c). The halogen heater is heated as the current flows in and a temperature of the same rises and so does the resistance value. As the resistance value rises, the current flowing into the halogen heater reduces and eventually converges to a normal current $I_0$, and the halogen heater resumes to a normal state. A ratio of the rush current $I_1$ to the normal current $I_0$, $I_1/I_0$, ranges from several to ten times. In case of the drawing, since the fusing heater is controlled to start to light on substantially at a zero crossing point of a power source voltage waveform, the rush current can be suppressed to a relatively small value.

As indicated by a curve (b) in the drawing, the rush current flowing into the halogen heater in the above manner causes a voltage drop $\Delta V_1$ around an outlet of the commercial power source that supplies a power to the image forming apparatus or in the other internal lines because of its own impedance. The curve (b) in the drawing represents an envelop of a wave height value of the voltage waveform when the voltage drops. After the current passing through the halogen heater has converged to the normal current, the voltage drop also converges into a small value $\Delta V_2$. When the power supply to the halogen heater is cut, the voltage recovers an original voltage level $V_0$.

Particularly, since the above rush current causes a significant voltage drop instantaneously, peripheral equipments or lighting equipments may be affected adversely. For example, when a voltage supplied to the lighting equipment drops, there occurs a phenomenon referred to as a flicker, in which illuminance is lowered instantaneously. Recently, to suppress this phenomenon (hereinafter, referred to simply as flicker(s)), devices that consume a large power with respect to the power source are regulated by the flicker test. The flicker test checks whether a voltage in the power source side is dropped below a predetermined level by the load provided in the apparatus. In case of the image forming apparatus, the flicker test is carried out in two modes using their respective regulation limits: a copy mode (the flicker test in this mode is referred to as short flicker) and a standby mode (the flicker test in this mode is referred to as long flicker).

To suppress the flickers, Japanese Laid-open Patent Application No. 242644/1994 (Tokukaihei No. 6-242644) discloses a method referred to as a softstart using a switching technique, in which a conduction angle at which a current passes through the load is increased step by step. When a power is supplied to the load like the above-mentioned halogen heater with the softstart, a current waveform is distorted and noises occur in a wide frequency bandwidth. This causes a malfunction of peripheral electronic equipment or imposes adverse effect on the same. To eliminate the above problem, the apparatuses are also regulated by another type of test referred to as the harmonics test which checks whether harmonic components (actually 2nd through 40th harmonics are checked, and hereinafter collectively referred to as harmonic noises) of the current waveform are within the regulation limit. The safety regulation requires the image forming apparatus to pass the harmonic test, in other words, to maintain the harmonic noises within the regulation limit in a normal copy mode.

Various countermeasures are proposed to clear these regulations. For example, aforementioned Japanese Laid-open Patent Application No. 242644/1994 (Tokukaihei No. 6-242644) also discloses a technique (generally known as the softstart) for suppressing the occurrence of the rush current by increasing the conduction angle step by step with a softstart circuit employing a bidirectional thyristor (also known as TRIAC). When this technique is adopted, the harmonic noises are produced in such a large quantity that an expensive noise filter must be provided to the power source line, thereby increasing the cost undesirably.

The technique disclosed in Japanese Laid-open Patent Application No. 242644/1994 (Tokukaihei No. 6-242644) relates to the method for reducing flickers generated while an entire system is operating by giving a time difference to each of a plurality of heaters to start the conductance at different times separately, and further by passing a current with the softstart. However, in the softstart, the harmonics are also generated by increasing the switching conduction angle to each heater lamp per half cycle from the conduction on the first half cycle in the conventional manner. Since this type of control method controls the flickers and harmonic noises of each heater lamp by the conventional switching, an expensive noise filter can not be omitted to reduce the harmonics.

As has been explained, the flickers are created by a rush current occurring at the start of devices (motors, lamps, etc.,) that need an important appeal current during a short time. When a solution adopted to reduce the rush current by instantaneously switching (phase control) the voltage on the device is implemented, a regularly increasing voltage is applied to the device, which reduces both the rush current and flickers. However, this solution generates the harmonic noises. The longer the switching, the lower the flickers and the higher the harmonic noise level.

SUMMARY OF THE INVENTION

It is therefore an object of the present invention to provide a power control unit which can reduce the flickers efficiently without generating too many harmonic noises by choosing desired conduction time and delay within an AC voltage cycle of the switching.

More specifically, the object of the present invention is to provide a power control unit which can reduce the flickers in a satisfactory manner while reducing the harmonic noises generated when a power supply is switched ON at the points other than zero crossing points under the phase control (switching) by supplying the power while increasing a conduction angle step by step through the phase control using a softstart circuit.

To fulfill the above object, a power control unit of the present invention including a load having a positive resistance characteristic to a temperature and a switching unit both connected to an AC power source in series to supply a power to the load by controlling the switching unit is characterized in that, (1) the switching unit includes:
   a first control mode for continuously supplying a power which is composed of a plurality of half cycle switching waveforms of a first polarity to the load;
   a second control mode for continuously supplying a power which is composed of a plurality of half cycle switching waveforms of a second polarity to the load, the second polarity being different from the first polarity; and
   a third control mode for supplying a power of a half cycle of the first polarity and a power of a half cycle of th e second polarity to the load in turn, and (2) the switching unit operates in order of the first control mode, second control mode, and third control mode.

According to the above arrangement, it has become possible to attain an effect that not only the harmonic noises, but also the flickers generated by a rush current can be reduced by supplying a plurality of half cycle switching waveforms of the first polarity and a plurality of half cycle switching waveforms of the second polarity to the load having a positive characteristic to heat.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a view explaining each component of a digital image forming apparatus;

FIGS. 15(a)–15(c) are views explaining a term definition related to a switching waveform.

DETAILED DESCRIPTION OF THE PREFERRED EMBODIMENTS

Figure 1:
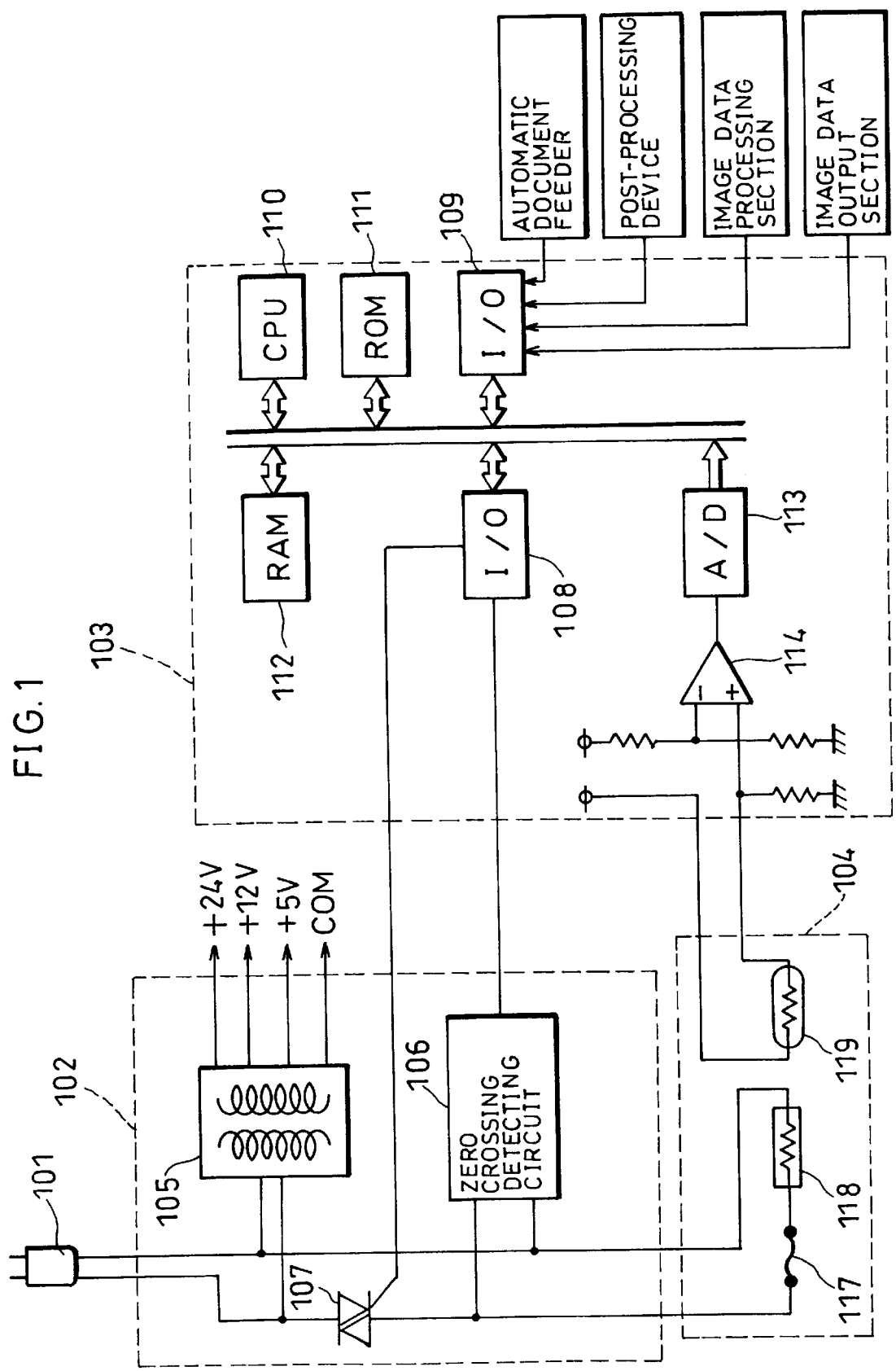
FIG. 1 is a block diagram schematically showing an arrangement of a control circuit of a heater lamp provided in an example embodiment of the present invention.

In the following, an example embodiment of the present invention will be explained using a copying machine as an example image forming apparatus with reference to FIGS. 1 through 15(c).

In the first place, each component of the image forming apparatus will be described briefly.

A digital image forming apparatus of the present embodiment is, for example, a digital copying machine comprising a scanner section, an image processing section, and an image recording section, and a heater lamp is provided therein as a fuser. To begin with, the digital image forming apparatus will be explained with reference to FIG. 2. The present image forming apparatus is a digital copying machine 30 comprising a scanner section 31 and a laser recording section 32.

In the following, a heater lamp control circuit used in the present invention will be explained with reference to FIG. 1, which is a block diagram showing an arrangement of major components of a power control unit provided in the image forming apparatus. In the drawing, numeral 101 denotes an AC power source connecting plug, numeral 102 denotes a power supply unit, numeral 103 denotes a control substrate, and numeral 104 denotes a fusing unit. The power supply unit 102 encloses a power source transformer 102, a zero crossing detecting circuit 106, and a TRIAC 107. The control substrate 103 encloses an I/O units 108 and 109, a CPU 110, a ROM 111, a RAM 112, an A/D convertor 113, amplifiers 114 and 115, and an error detecting thermister 116. The fusing unit 104 encloses a temperature fuse 117, a fusing heater (heater lamp) 118, and a fusing thermister 119.

Here, the power supply unit 102 and control substrate 103 form switching means.

Figures 3A, 3B:
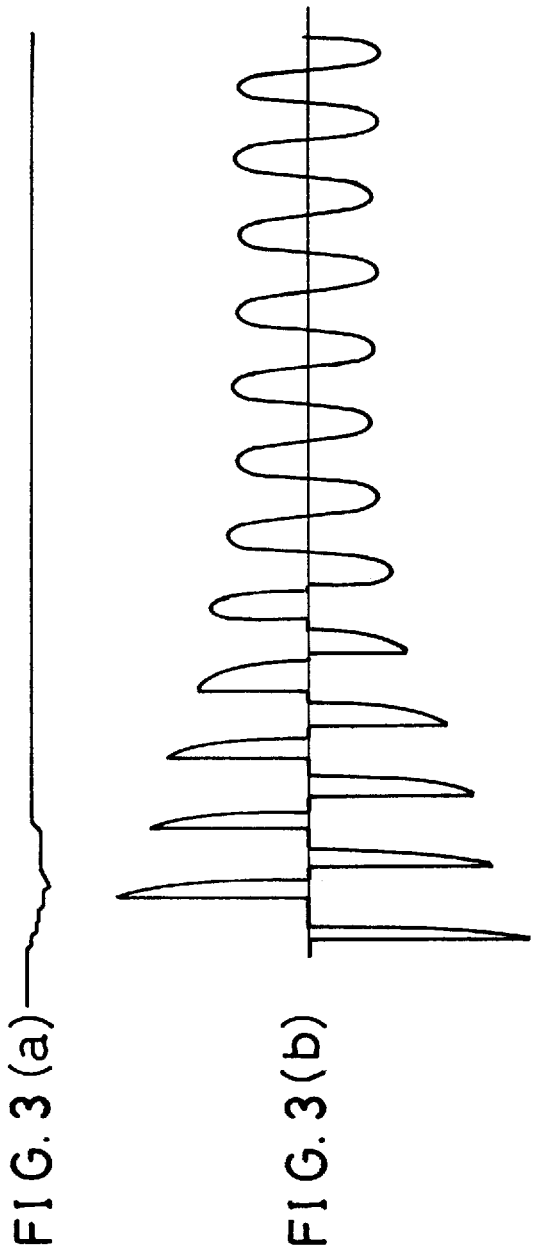
FIGS. 3(a) and 3(b) are views explaining flickers and a current waveform when the softstart is carried out.

In the following, the ON/OFF calling of a heater lamp signal HL and delay count down will be explained. The heater lamp is controlled by a subroutine which turns ON/OFF the heater lamp signal HL. The subroutine is called upon by an interruption of a zero crossing signal occurring at each zero crossing of an AC voltage. If the signal HL requests ON, the subroutine switches ON the voltage of the heater lamp after a delay. As shown in FIGS. 3(a) and 3(b), the delay occurs on each half cycle until the flicker risk is no longer significant.

Table 1 below shows a content of a ROM table on the control substrate, namely, a part of a control program pre-stored in the ROM 111, based on which the CPU 110 judges the operating condition of the image forming apparatus, namely, standby mode or copy mode. Then, the CPU 110 selects a power control mode of the system based on the judgement to start the power supply control to the fusing heater.

TABLE 1

| Mode | Data Items | ROM Data |
| --- | --- | --- |
| Main Body Mode | Copy Mode | 0 |
|  | Standby Mode | 1 |
| Control Mode A | 1st half cycle | 8 ms |
|  | 2nd half cycle | OFF |
|  | 3rd half cycle | 8 ms |
|  | 4th half cycle | OFF |
|  | 5th half cycle | 7 ms |
|  | 6th half cycle | OFF |
|  | 7th half cycle | 7 ms |
|  | 8th half cycle | OFF |
|  | 9th half cycle | 7 ms |
|  | . . . | . . . |

Figure 4:
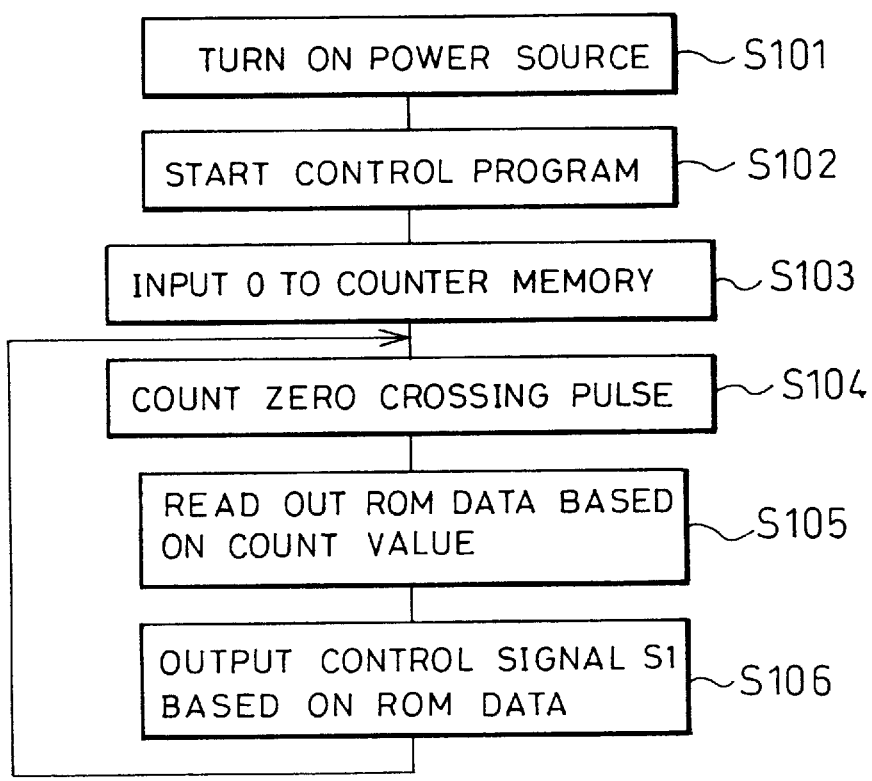
FIG. 4 is a flowchart detailing an operation to set a conduction delay of the heater lamp by a control pattern stored in a ROM of FIG. 1.

FIG. 4 is a flowchart detailing an operation to set a conduction delay of the heater lamp by a control pattern pre-stored in the ROM of Table 1 above. To begin with, the power source is turned on (S101). Then, when a zero crossing signal matching with the AC power waveform interrupts while the CPU is controlling the electrophotographic copying machine as programmed, a control program corresponding to the control mode starts (S102). The control program for each control mode is pre-stored in the ROM. At the moment the zero crossing signal interrupts the program, the count down starts per zero crossing timing of the power source (S103 and S104) Then, ROM data are read out based on the count value (S105), and a control signal S corresponding to the ROM data is outputted (S106). In this manner, a delay is determined arbitrary by the program pre-stored in the ROM to effect the switching. When the delay control pattern ends, the AC voltage of the heater lamp is switched to Continuous ON.

For example, a control mode A corresponds to a portion where a switching pattern of the power control means in the standby mode is stored.

In this mode, since a delay time from the zero crossing timing in the first half cycle is set to 8 ms, the conduction phase angle is 2 ms when the power source frequency is 50 Hz. A current is not allowed to pass in the next second half cycle. Then, in the next third half cycle, a delay time from the zero crossing timing is set to 2 ms like in the first half cycle. The power is controlled by reading the ROM data per half cycle in the above manner.

In the present embodiment, as shown in FIG. 1, the second thermister 116 is provided in the control substrate 10, so that the control substrate 10 can detect the current state of the system (for example, copy mode, pre-heat mode, standby mode, cold start) based on the temperature of each component in the system (for example, temperatures of a fusing section and inside the apparatus) to manage the power information of the system while controlling an amount of rush current and an amount of noises generated of the system within a predetermined range. For example, the resistance value of the fusing heater increases when the temperature is low, and decreases when the temperature is high. In other words, the resistance value has a positive characteristic with respect to heat. Thus, if the heater ON control is carried out at a low temperature, a large rush current flows in.

In the present embodiment, the fusing heater 118 and the TRIAC 107 serving as power control means are provided in series to the AC power source, so that the ON/OFF control of the fusing heater and the conduction at an arbitrary phase are carried out by a command signal from the CPU 110 provided on the control substrate 103. In other words, when the fusing heater is switched to ON from OFF, a zero crossing point of an AC power source voltage waveform is detected by the zero crossing detecting circuit 106, whereupon a zero crossing signal is generated. Subsequently, the power control means 107 effects the switching upon receipt of a control signal Si from the CPU 110, so that a current is allowed to pass through the heater by turning ON the voltage waveform while the signal S1 stays ON (negative signal). After the phase adjusting period ends, a sum of the currents is flown to the heater under the zero crossing control.

During the phase adjusting period, the control can be carried out using a smaller conducting phase angle compared with a case where a power is supplied to the heater for a complete waveform. Thus, a rush current flowing into the fusing heater can be reduced. In case that a room light, or a plurality of other apparatuses, such a printer and a host computer, are also connected to the AC power source line near the image forming apparatus 1, the AC power source voltage drops due to the rush current flowing into the fusing heater, and so does a power source line supplied to the room light. This may cause an illuminance flicker or a drop in the power source voltage to the other apparatuses, thereby giving adverse effects to the room light or other apparatuses.

The harmonic noises means harmonics with respect to a commercial power source frequency generated by a waveform distortions on a power supply signal created by devices which use non-sinusoidal currents, and also means the harmonic noises subject to regulation in major countries. Flickers are fluctuations on the power supply line created by passing a current through a load connected to the power source.

The most effective solution to remove the flickers is to switch on enough cycles. However, the harmonic noises have a more delicate point. Although the harmonic noises can not be removed but the distribution of the same can be changed. Some harmonic noises increase while the rest decrease depending on the types of switching. Therefore, to develop a softstart solution, at least the points following the conventional practice specified below should be observed.

That is to say, first of all, the actual measured values of the flickers and harmonic noises are obtained for evaluation. Then, the harmonic noise pattern is analyzed to evaluate the margin of the harmonic noises (even and odd rank) to the safety regulation limit and target regulation limit. Then, an optimal softstart switching is assembled by changing the number of medium delay cycles (conduction time of 1–4 ms) and the number of conduction cycles. A pattern in which the harmonic noises increase with the number of switched cycles (the number of switched half cycles) should be carefully observed.

Here, too long conduction times are not effective in reducing the harmonic noises. Also, conduction time should be adjusted for the 100/120/230V series.

Next, many measurements are made to adjust the number of switched cycles and the conduction time during these cycles step by step. This is done to obtain a compromise between (balance of) the number of switched cycles and harmonic noise distribution.

In a mode where the harmonic noises are measured, less number of half cycles are switched with an increased conduction time, whereas in a mode where the flickers are more important and the harmonic noises are not measured, a great number of half cycles are switched.

Next, the data measured in Comparative Examples 1 and 2 without applying the present invention will be explained. In the comparative examples, the flickers and harmonic noises are measured using a 230V/50 Hz series having a heater lamp of 1000 W.

The measuring results of the flickers and harmonic noises in Comparative Examples 1 and 2 and the present embodiment are set forth in Table 2 below.

TABLE 2

| Measuring Mode | Harmonics Noises Copy Mode | Flickers Copy Mode Short Test | Flickers Standby Mode Long Test |
| --- | --- | --- | --- |
| Limit | | 1.0 | 0.65 |
| Comparative Example 1/ Monotonous Softstart | over | margin | — |
| Comparative Example 2/ Without Softstart | sufficient margin | 1.27 | 1.3 |
| Present Invention | OK | 0.86 | 0.53 |

The measurements are made by placing the image forming apparatus under different conditions. More specifically, the softstart for monotonously increasing a conduction time per half cycle is used in Comparative Example 1, whereas the softstart is not used in Comparative Example 2.

The harmonic noise test and short flicker test are measured in the copy mode, and the long flicker test is measured in the standby mode.

The copy mode referred herein is the mode in which the power supply to the image forming apparatus starts to form an image when the heater lamp has been kept cool. The standby mode is the mode in which the test image forming apparatus has been kept in a ready state without carrying out the image forming operation since the power source switch was turned ON.

In the copy mode of Comparative Example 1, the monotonous softstart is adopted, but the harmonic noises exceeding the regulation limit are generated. As to the flickers, there is a margin to the regulation limit of 1.0.

In contrast, it is very loose on the harmonic noises and severe on the flickers in Comparative Example 2.

As previously explained with reference to FIGS. 15(a)–(c), the flickers are mainly created at the start of lighting on the heater lamp. An important peak current induces fluctuation on the AC voltage of the power supply. The measurement of the full cycle signal from the transformer reveals that there is a flicker of a 4-V drop on the effective voltage and the voltage recovers the original level when the heater lamp starts up after several cycles.

Next, the conventional switching with the softstart to reduce the flickers will be explained.

Figure 5:
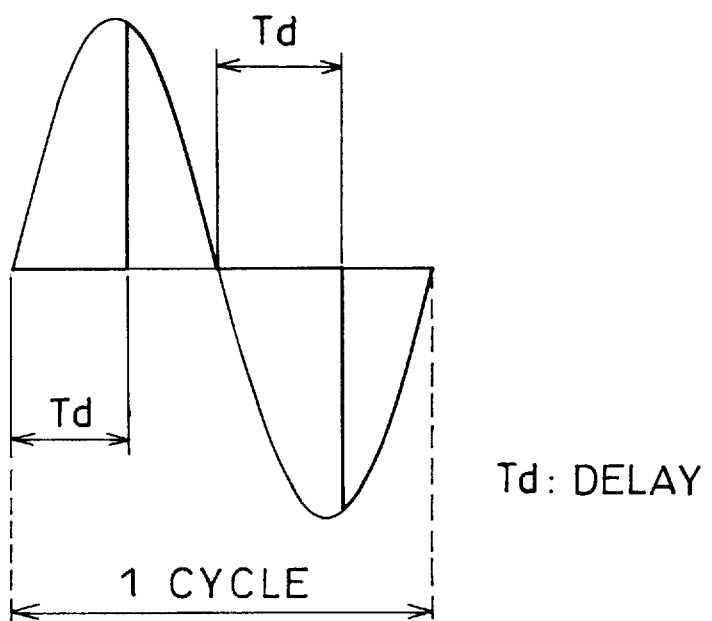
FIG. 5 is a view explaining the flickers and a rush current waveform.

As shown in FIG. 5, this is the method for controlling the start of the heater lamp when lighting the same using a softstart. This method reduces a rush current that occurs at the beginning of lighting the heater lamp by introducing a delay of a period Td from the zero crossing timing when switching each cycle of the heater lamp voltage.

This method can reduce the flickers, but creates the harmonic noises. Nevertheless, the switching on the cycles with delays have to be continued until a flicker risk disappears as shown in FIGS. 3(a) and 3(b). In the drawing, curve (a) denotes a voltage and curve (b) denotes a current having a regularly decreasing delay profile.

Thus, the difficultly of the problem is to handle both the phenomenons, namely, flickers and harmonic noises, concurrently.

Therefore, it is necessary to choose an adequate period of the cycle switching with delays and an optimal delays of conduction within the AC voltage cycles. Therefore, it is an object of the present invention is to reduce the flickers efficiently without generating too many harmonic noises.

Note that, however, the modification should not induce perturbations on the current that drives the electrophotographic copying machine. Also, the modification should not give any adverse effect to the ON/OFF signal of the heater lamp, control circuit, commands issued by the CPU and the like.

To fulfill the above object an improved softstart solution with a switching on approximately 100 half cycles under the softstart control with a regularly decreasing delay profile was studied by the inventors.

This solution was tested with several combinations of the switching conduction phase angle and a conduction time but all of them generated too many harmonic noises in the copy mode.

Comparison of the harmonic noises measured on the test image forming apparatus revealed that there is a comfortable margin on the even harmonic noises and a narrow margin or a negative margin on the odd harmonic noises. This observation led the inventors to a study of a softstart solution such that produces odd and even harmonic noises within the regulation limit.

Next, the relation between the switching pattern and harmonic noises will be explained as an outcome of the study suggested by the above observations.

Information as to the characteristics of the harmonic noises of three types of control patterns is set forth in Table 3 below.

TABLE 3

| Switching Pattern | Current Waveform | Level of Even Harmonics Generated | Level of Odd Harmonics Generated | Harmonic Test |
|---|---|---|---|---|
| A | 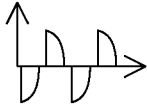 | low | high | X |
| B | 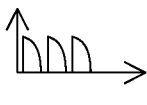 | high | low | X |
| C |  | medium | medium | O |

Control pattern A in Table 3 above is a signal similar to the one used for the softstart adopted by the test apparatus. This type of signal produces many odd harmonic noises but is very effective in reducing the flickers.

Control pattern B in Table 3 above produces even harmonic noises, and was expected to be an ideal signal to solve the problems. However, after the solution is tested, the even harmonic noises measured are too important and exceed the regulation limit.

Control pattern C in Table 3 above is a solution adopted for the softstart of the present invention. This type of signal produces both types (odd and even) harmonic noises, but the level of which can be adjusted by choosing the correct number of cycles and the precise delay (phase angle) of switching.

Control pattern C is a combination of two even function waveforms of opposite signs, and in fact, it is an even function waveform with a slight touch of odd function. Control Pattern C is a compromise for reducing both the harmonic noises and flickers.

Then, the result of the study on the flicker countermeasures will be explained in the following.

The copy mode and standby mode are treated under different conditions because their regulation limits are quite different.

The harmonic noises measured in the copy mode are set forth in Table 4 below. In the table, a symbol o denotes that the result passes the test.

TABLE 4

| Harmonics | Level | Limit | Test Pass | Ratio |
|---|---|---|---|---|
| 2 | 0.053 | 1.08 | o | 20.38 |
| 3 | 0.503 | 2.3 | o | 4.57 |
| 4 | 0.02 | 0.43 | o | 21.5 |
| 5 | 0.155 | 1.14 | o | 7.35 |
| 6 | 0.012 | 0.3 | o | 25 |
| 7 | 0.116 | 0.77 | o | 6.64 |
| 8 | 0.008 | 0.23 | o | 28.75 |
| 9 | 0.147 | 0.4 | o | 2.72 |
| 10 | 0.006 | 0.184 | o | 30.67 |
| 11 | 0.122 | 0.33 | o | 2.7 |
| 12 | 0.006 | 0.153 | o | 25.5 |
| 13 | 0.104 | 0.21 | o | 2.02 |
| 14 | 0.004 | 0.131 | o | 32.75 |
| 15 | 0.073 | 0.15 | o | 2.05 |
| 16 | 0.004 | 0.115 | o | 28.75 |
| 17 | 0.073 | 0.132 | o | 1.81 |
| 18 | 0.004 | 0.102 | o | 25.5 |
| 19 | 0.061 | 0.118 | o | 1.93 |
| 20 | 0.002 | 0.092 | o | 46 |
| 21 | 0.051 | 0.107 | o | 2.1 |
| 22 | 0.002 | 0.084 | o | 42 |
| 23 | 0.043 | 0.098 | o | 2.28 |
| 24 | 0.002 | 0.077 | o | 38.5 |
| 25 | 0.039 | 0.09 | o | 2.31 |
| 26 | 0.002 | 0.071 | o | 35.5 |
| 27 | 0.039 | 0.083 | o | 2.13 |
| 28 | 0.002 | 0.066 | o | 33 |
| 29 | 0.037 | 0.078 | o | 2.11 |
| 30 | 0.002 | 0.061 | o | 30.5 |
| 31 | 0.035 | 0.073 | o | 2.09 |
| 32 | 0.002 | 0.058 | o | 29 |
| 33 | 0.031 | 0.068 | o | 2.19 |
| 34 | 0.002 | 0.054 | o | 27 |
| 35 | 0.028 | 0.064 | o | 2.29 |
| 36 | 0.002 | 0.051 | o | 25.5 |
| 37 | 0.028 | 0.061 | o | 2.18 |
| 38 | 0.002 | 0.048 | o | 24 |
| 39 | 0.022 | 0.058 | o | 2.64 |
| 40 | 0.002 | 0.046 | o | 23 |

Table 4 above reveals that the margin on a few harmonic noises is tight. Therefore, the number of cycles switched should be optimized. In other words, the least number of cycles should be switched without inducing too much harmonic noise increase.

In the standby mode, on the contrary, the harmonic noises does not have to be measured, and therefore, as many cycles as desired are switched to reduce the flickers to below the regulation limit in a secure manner.

Table 2 above shows the test results of the flickers and harmonic noises in each mode of the present embodiment with one target value (limit) of the flickers within the safety regulation for comparison.

In the standby mode, although the standby regulation limit is as tight as 0.65 compared with 1 in copy mode, the measured flickers are well below the regulation limit. Therefore, the number of cycles switched is great herein.

The delays of conduction start timing are also very important. The best results in terms of target value (safety regulation limit) was obtained with conduction time up to 5 ms. This increases the number of switched cycles and the harmonic noise level, but taking too long conduction time is not as efficient as to reduce the flickers.

Figure 6:
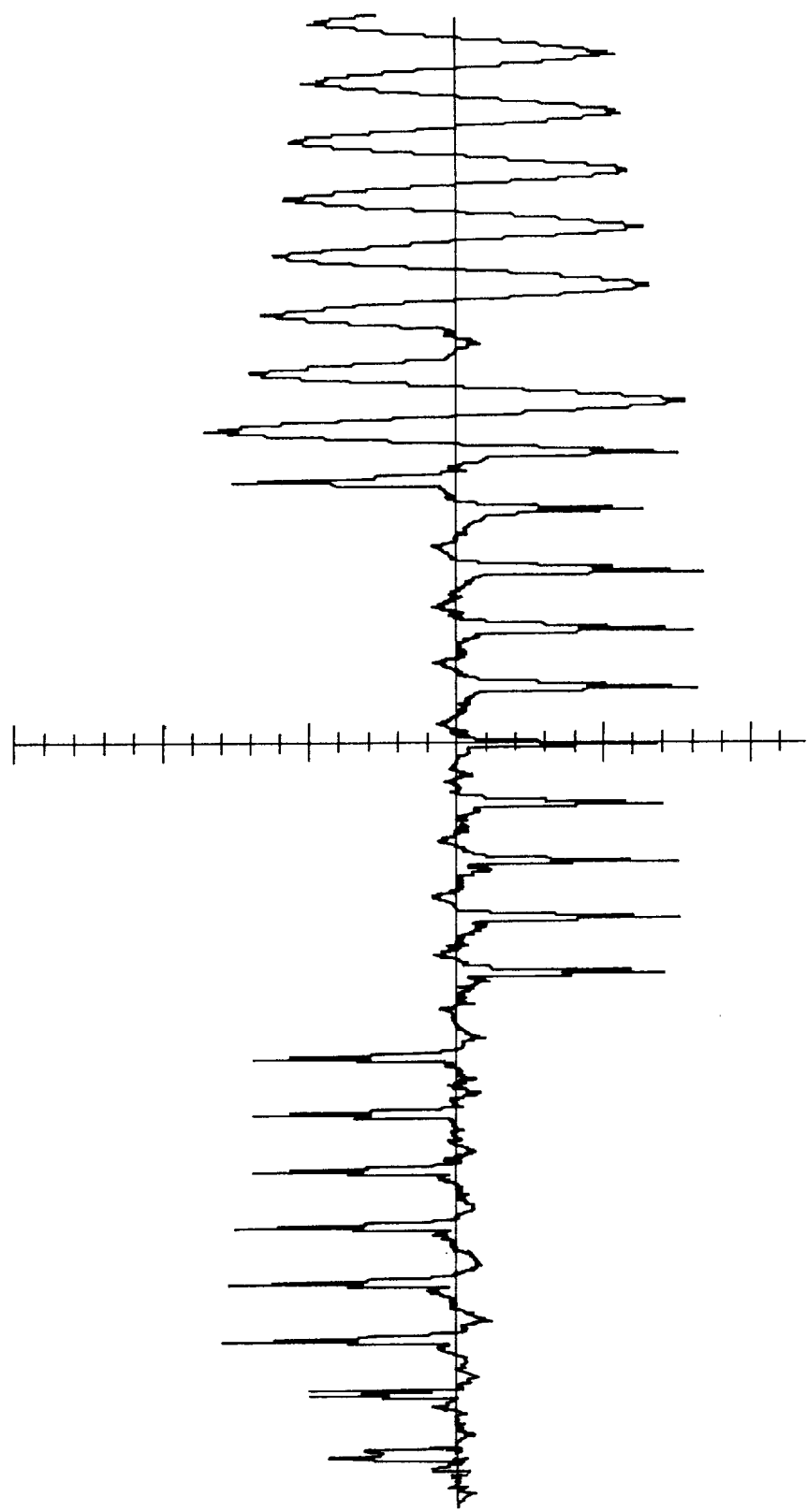
FIG. 6 is a graph showing a current waveform when cycles are switched.

Next, the switching using Control Pattern C of Table 3 above, which is the gist of the present invention, will be explained with reference to FIG. 6 and Table 5 below. Table 5 below represents a switching pattern used in the present embodiment.

TABLE 5

| | Switching Characteristics | | |
|---|---|---|---|
| Step # | Number of Half Cycle | Conduction Time (ms) | Delay Time (ms) |
| 1 | 2 up | 2 | 8 |
| 2 | 6 up | 3 | 7 |
| 3 | 2 blanks | — | — |
| 4 | 5 down | 3 | 7 |

TABLE 5-continued

| | | Switching Characteristics | |
|---|---|---|---|
| Step # | Number of Half Cycle | Conduction Time (ms) | Delay Time (ms) |
| 5 | 3 down | 4 | 6 |
| 6 | 3 up & down | 4 | 6 |
| 7 | 1.5 complete cycle | 0 | 10 |
| 8 | 1 blank | — | — |

First and Second Steps

The first step includes 2 up switched half cycles, and the second step includes 6 up switched half cycles. The first and second steps can improve the harmonics noises set forth in Table 4 above.

Besides the object of reducing the flickers, the present invention has another object to carry out the softstart without producing too many harmonic noises exceeding the safety regulation limit. This is the reason why the first step of 2 up switched half cycles is begun at a conduction time of 2 ms.

Then, the conduction time in the second step is increased by 1 ms from the conduction time in the first step to boost the heating. This is the least increment due to the timer possibility. Increasing the conduction time by 2 ms (that is, increasing the conduction time from 2 ms to 4 ms) in the second step of 6 up switched cycles may have a negative impact on the flickers, because the process is not stabilized yet. If the conduction phase angle is increased by 2 ms, at least additional 5 half cycles, namely, at least 10 half cycles in total, should be switched to stabilize the process and ensure that a risk of the flickers is no longer significant. However, this can increase the number of switched half cycles, and therefore increase the harmonic noise level against the target value set in the present invention. This is the reason why the conduction time is increased by 1 ms in the second step from the conduction time in the first step of 2 up switched half cycles.

Third Step

Figure 7:
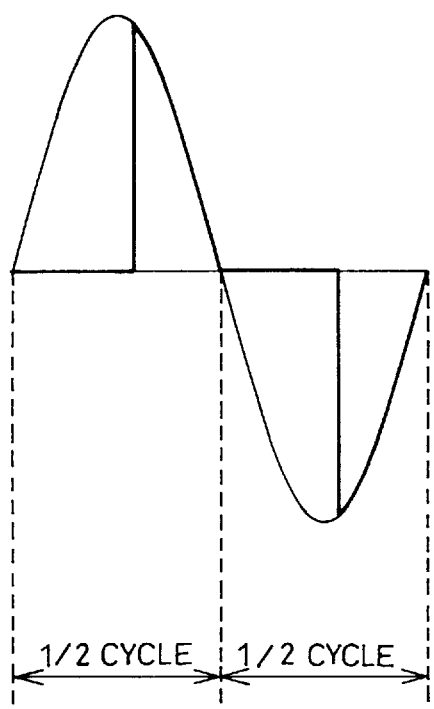
FIG. 7 is a view schematically explaining a switched current waveform.

This step includes blanks of 2 half cycles (hereinafter referred to simply as blanks). These blanks are very important to reduce odd harmonic noises. Removing these blanks would connect the two switching patterns (2+6 up and 5+3 down of FIG. 6). This produces a continuous switching waveform at the junction between the sixth half cycle of a first polarity in the second step (having a pattern of 7 ms delay and 3 ms conduction) and the following first half cycle of a second polarity (the first and second polarities are opposite with respect to each other) in the following fourth step as shown in FIG. 7. FIG. 7 is a view explaining the power supply in case of the switching on the upper (first polarity) half cycle followed by the switching on the lower (second polarity) half cycle. In this case, it is acknowledged that many odd harmonics are generated.

Another set of two blanks at the junction is not necessary, because it would cool the heater lamp over a considerable time and thus produce a bigger flicker when starting to switch a control mode (5+3 down of FIG. 6) where a power is supplied by continuous switching of half cycles of the second polarity. In view of the foregoing, a non-conduction time (blank) twice as long as a half cycle is the optimal choice in any case.

Figure 8:
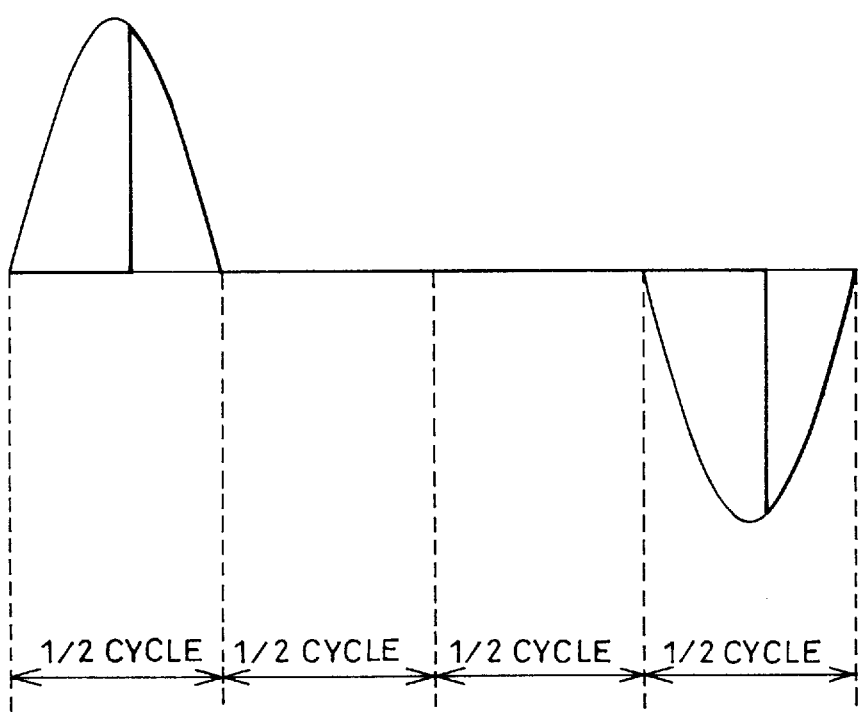
FIG. 8 is another view schematically explaining a switched current waveform.

FIG. 8 is a view explaining the power supply in case of the switching of the upper (first polarity) half cycle followed by the non-conduction time twice as long as the half cycle and the switching of the lower (second polarity) half cycle. In this case, it is acknowledged that the odd harmonics are reduced significantly. This switching pattern is directly related to the concern described as to Control Pattern A in Table 3 above.

Fourth Step

This step includes 5 down switched half cycles. The first five half cycles have a conduction time of 3ms. This conduction time is the same as the one for the six last half cycles of the first polarity in the second step, because increasing this time after the non-conduction time (blanks) of two half cycles (the third step) would generate a too large flicker.

Fifth Step

Then, for the following 3 down switched half cycles of the second polarity, the conduction time is increased by 1 ms from the conduction time in the fourth step. The flicker produced by this increase is very small. The reason why the conduction time is increased by 1 ms as mentioned above is to pass the current for a full half cycle without delay. Increasing the conduction time by 2 ms (that is, increasing the conduction time from 3 ms to 5 ms) at this stage would generate a too large flicker. This is because, an increase in the rush current tends to increase the flickers like in the starting of the conduction in the first polarity.

Sixth Step

This is a switching of 3 up & down switched half cycles. The purpose of this step is to reduce the flickers that remain on the voltage after the 2+6 up, 2 blanks, and 5+3 down switched half cycles. A small remaining flicker is acknowledged when these 3 switched half cycles are omitted. One half cycle with delay is switched alternately until the remaining flicker disappears. Like the last half cycle in the second even function waveform (fourth and fifth steps), a conduction time of 4 ms is maintained to ensure the continuity.

Seventh Step

This is a switching of 3 up & down switched half cycles (1.5 up & down switched full cycle), and the beginning of the heating pattern of a regular heater lamp.

Eighth Step

This step includes a blank of a half cycle, and the purpose of this blank is to remove the last flicker on the voltage.

The signal in each step is related to many parameters, such as the heater lamp, device under control, voltage amplitude, and frequency. The principle of the switched half cycles, that is, $N_1$ (2+6 up of Table 5) up switched half cycles of a large first polarity and $N_2$ (5+3 down of Table 5) down switched half cycles with a large second polarity separated by two blanks, can be applied to any case. The number ($N_1$ and $N_2$) of switched half cycles can be changed depending on the depth of the flickers and the level of the harmonic noises.

The rest of the half cycles, 3 up & down (6th step), 1.5 full cycle (7th step), and the blank (8th step) are added to reduce the flickers and harmonic noises on the test apparatus. The number of these additional half cycles be adjusted by analyzing a voltage signal on the device under control. It should be noted that choosing the correct conduction time is very important at any moment of the switching. If the conduction time is too long, the heating is continued but the flickers remain. In case of the test apparatus used herein, the flickers reach the upper limit at a conduction time of 5 ms. Here, 5 ms is smaller than the value obtained in the case without softstart. However, it should be noted that the flickers can be large if the conduction time is too long even with the softstart. Therefore, the conduction time should be determined carefully. On the other hand, if the conduction time is too short, the flickers can be removed but the heating takes a long time. This is because only a slight amount of energy is supplied to the heater lamp or device under control. Also, the harmonic noises increase. As previously mentioned, these conduction times depend on the types of the device under control, voltage amplitude, and frequency.

Next, the switching pattern in the standby mode will be explained.

Table 6 below shows a switching pattern when the present invention is implemented in the standby mode.

TABLE 6

Switching Pattern in Standby Mode

| Step # | Number of Half Cycles | Conduction Time (ms) | Delay Time (ms) |
|---|---|---|---|
| 1 | 14 up & down | 2 | 8 |
| 2 | 53 up & down | 4 | 6 |
| 3 | 1 blank | — | — |
| 4 | 3 up & down | 2 | 8 |

Figure 9:
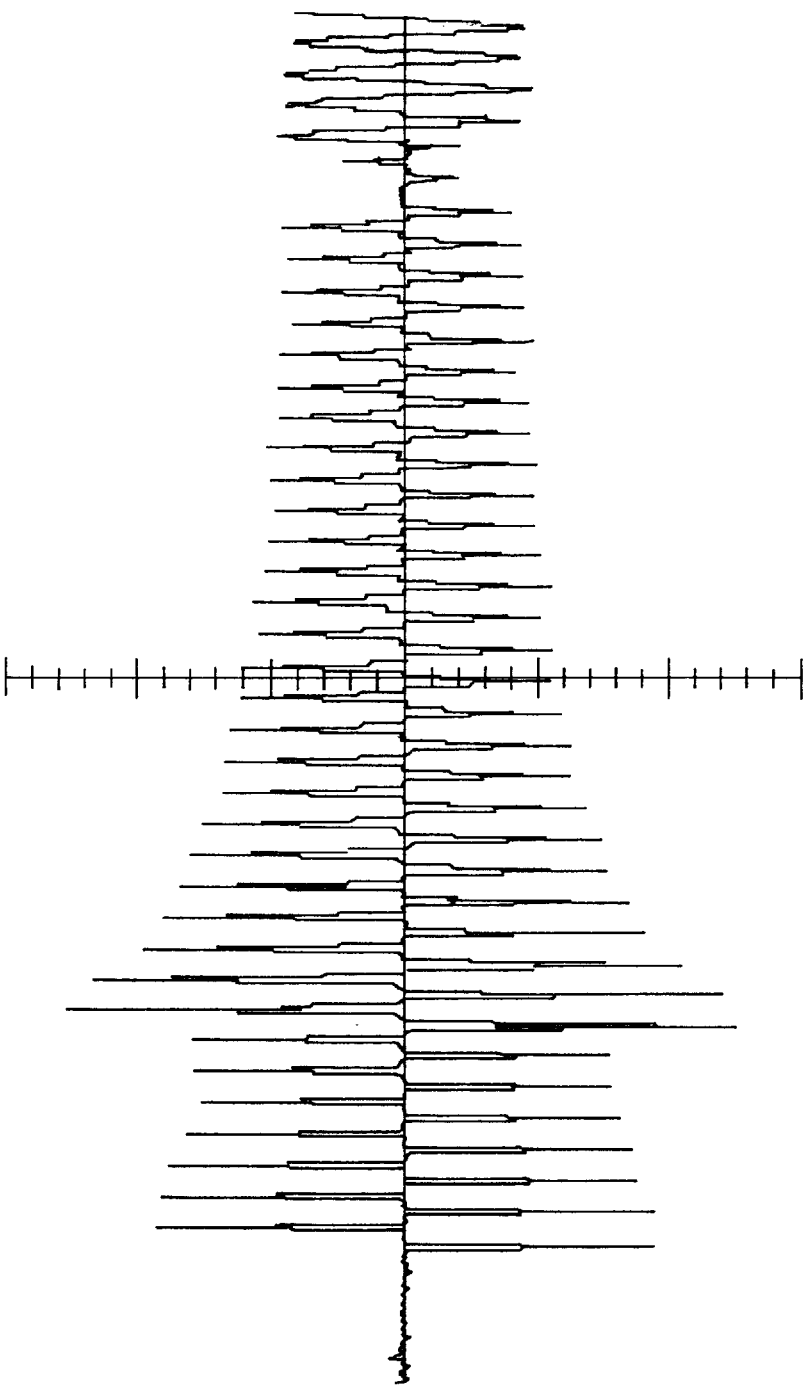
FIG. 9 is a graph showing a current waveform when cycles are switched.

FIG. 9 shows the switching waveform shaped when the heater lamp is controlled under the switching pattern of Table 6. The signals are analyzed in the standby mode in the following manner.

When the softstart is carried out normally in this mode, there is a margin to the safety regulation limit. Thus, the flickers can be reduced to below the regulation limit without a complex combination of the waveform controls. In short, the control using Control Pattern A of Table 3 above is sufficient. The flickers can be readily reduced merely by setting the conduction time precisely.

The switching procedure will be explained in the following with reference to Table 6 above.
First & Second Step In this step, the switching is effected by 14 up & down switched half cycles followed by 53 up & down switched half cycles. The heating is started with a short conduction time of 2 ms during the 14 half cycles to reduce the flickers. After stabilization, the conduction time is increased to 4 ms. After the conduction of 14 half cycles, the resistance of the heater lamp increases to a level where the flickers can no longer be generated.

Since the resistance value of the heater increases in the standby mode, the flickers are not generated even if the switching takes a long time. However, in the copy mode, since the harmonic noises increase with the number of switched cycles, the least number of half cycles should be switched. Therefore, an increment of the conduction time should be smaller in the copy mode than in the standby mode.
Third Step This step includes a blank of a half cycle.
Fourth Step This step includes 3 up & down switched half cycles. This step is effective in controlling the heater lamp provided in an electrophotographic copying machine. These half cycles can be adjusted or set manually to a requested value by analyzing the voltage signal on the device under control.

Like the copy mode signal, the standby signal is also related to many parameters, such as the lamp, device under control, voltage amplitude, and frequency. Thus, the number of switched half cycles is adjusted depending on the depth of the flickers and the level of the harmonic noises.

Table 2 above shows the flickers and harmonic noises measured on the test apparatus in the copy mode under the softstart with the target values (limits) of the flickers within the safety regulation for comparison.

The harmonics measured with the softstart of the present invention in the copy mode are set forth in Table 7 below. A symbol ○ denotes that the results pass the test.

TABLE 7

| Harmonics | Level | Limit | Test Pass |
|---|---|---|---|
| 2 | 0.271 | 1.08 | ○ |
| 3 | 0.783 | 2.3 | ○ |
| 4 | 0.136 | 0.43 | ○ |
| 5 | 0.387 | 1.14 | ○ |
| 6 | 0.071 | 0.3 | ○ |
| 7 | 0.204 | 0.77 | ○ |
| 8 | 0.033 | 0.23 | ○ |
| 9 | 0.146 | 0.4 | ○ |
| 10 | 0.026 | 0.184 | ○ |
| 11 | 0.142 | 0.33 | ○ |
| 12 | 0.022 | 0.153 | ○ |
| 13 | 0.098 | 0.21 | ○ |
| 14 | 0.022 | 0.131 | ○ |
| 15 | 0.098 | 0.15 | ○ |
| 16 | 0.022 | 0.115 | ○ |
| 17 | 0.083 | 0.132 | ○ |
| 18 | 0.02 | 0.102 | ○ |
| 19 | 0.083 | 0.118 | ○ |
| 20 | 0.022 | 0.092 | ○ |
| 21 | 0.069 | 0.107 | ○ |
| 22 | 0.02 | 0.084 | ○ |
| 23 | 0.063 | 0.098 | ○ |
| 24 | 0.016 | 0.077 | ○ |
| 25 | 0.055 | 0.09 | ○ |
| 26 | 0.012 | 0.071 | ○ |
| 27 | 0.055 | 0.083 | ○ |
| 28 | 0.012 | 0.066 | ○ |
| 29 | 0.051 | 0.078 | ○ |
| 30 | 0.012 | 0.061 | ○ |
| 31 | 0.049 | 0.073 | ○ |
| 32 | 0.01 | 0.058 | ○ |
| 33 | 0.041 | 0.068 | ○ |
| 34 | 0.008 | 0.054 | ○ |
| 35 | 0.039 | 0.064 | ○ |
| 36 | 0.008 | 0.051 | ○ |
| 37 | 0.033 | 0.061 | ○ |
| 38 | 0.01 | 0.048 | ○ |
| 39 | 0.035 | 0.058 | ○ |
| 40 | 0.008 | 0.046 | ○ |

The result set forth in Table 7 reveals that the flickers and harmonic noises generally depend on the types of the apparatus.

Applying the present invention in a variety of combinations as specified above can reduce the harmonic noises and flickers more efficiently.

The present invention described above is applied to the test apparatus, namely, an electrophotographic copying machine of 230V/50 Hz series having a heater lamp. Note that, however, the present invention is also applicable to a switching circuit or the like besides the components of the copying machine directly related to the flickers and the generation of the harmonic noises, such as the heater lamp and a copy lamp. When one of the components forming the electrophotographic copying machine is replaced, the arrangement of the present invention is incorporated into the softstart computer program, so that the flickers and harmonic noises can be reduced efficiently by the updated softstart solution.

Switching in many different conduction times can increase the harmonic noises. However, in the present invention, the harmonic noises can be reduced by setting a less number of kinds of conduction phase angles.

In case of continuous switching on a small number of half cycles, a large flicker can be prevented by increasing the conduction time step by step. This tendency is observed inherently in the copy mode.

When the phase angle exceeds 90°, the harmonics tend to increase. When many harmonics are generated, an expensive noise filter must be used or the switching becomes more complicated, thereby making it difficult to reduce the harmonics. However, in the present invention, the switching is effected at the conduction phase angle of the source power voltage at 90° or below (conduction time of 5 ms or less at 50 Hz), thereby lowering the harmonic noise level.

Figure 10:
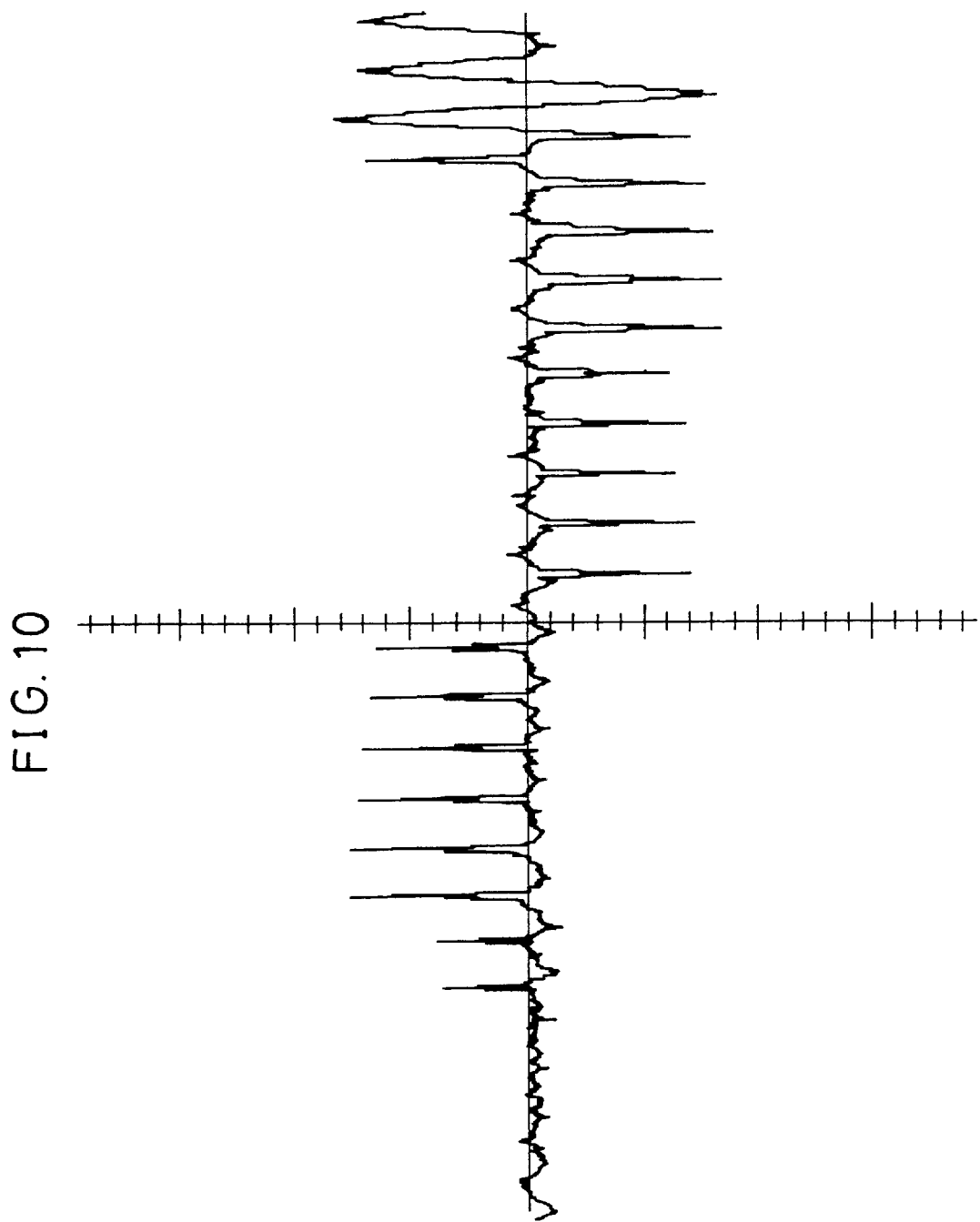
FIG. 10 is another graph showing a current waveform when cycles are switched in a copy mode.

Next, the following description will describe another current waveform switched in the copy mode illustrated in FIG. 10. This type of switching can reduce the short flicker to as low as 0.86 with respect to the safety regulation limit of 1.0 as previously shown in Table 2 above, while keeping the harmonic noises within the regulation limit. The switching pattern of FIG. 10 is composed of 2+6 up switched half cycles, followed by 2 blanks, 8 down switched half cycles, 3 up & down switched half cycles, 1 complete cycle, and 1 blank of a half cycle, and after which a switching (with no delay) at the zero crossing (ZC switching) of the commercial power source, namely, a normal heater lamp ON signal, comes.

The purpose of each switching step is set forth in the following.

| | Purpose of Each Switching Step |
|---|---|
| 8 up | reduce harmonic noises to below regulation limit |
| 2 blanks | separation for inversion of period reduce harmonic noises |
| 8 down | reduce harmonics noises to below regulation limit |
| 3 up & down | reduce flickers after harmonic noise reduction cycles |
| complete cycle | power boost (additional heating) |
| blank | reduce small flicker before ZC switching |

Example modifications of the above switching pattern are shown in Table 8 below.

Figure 11:
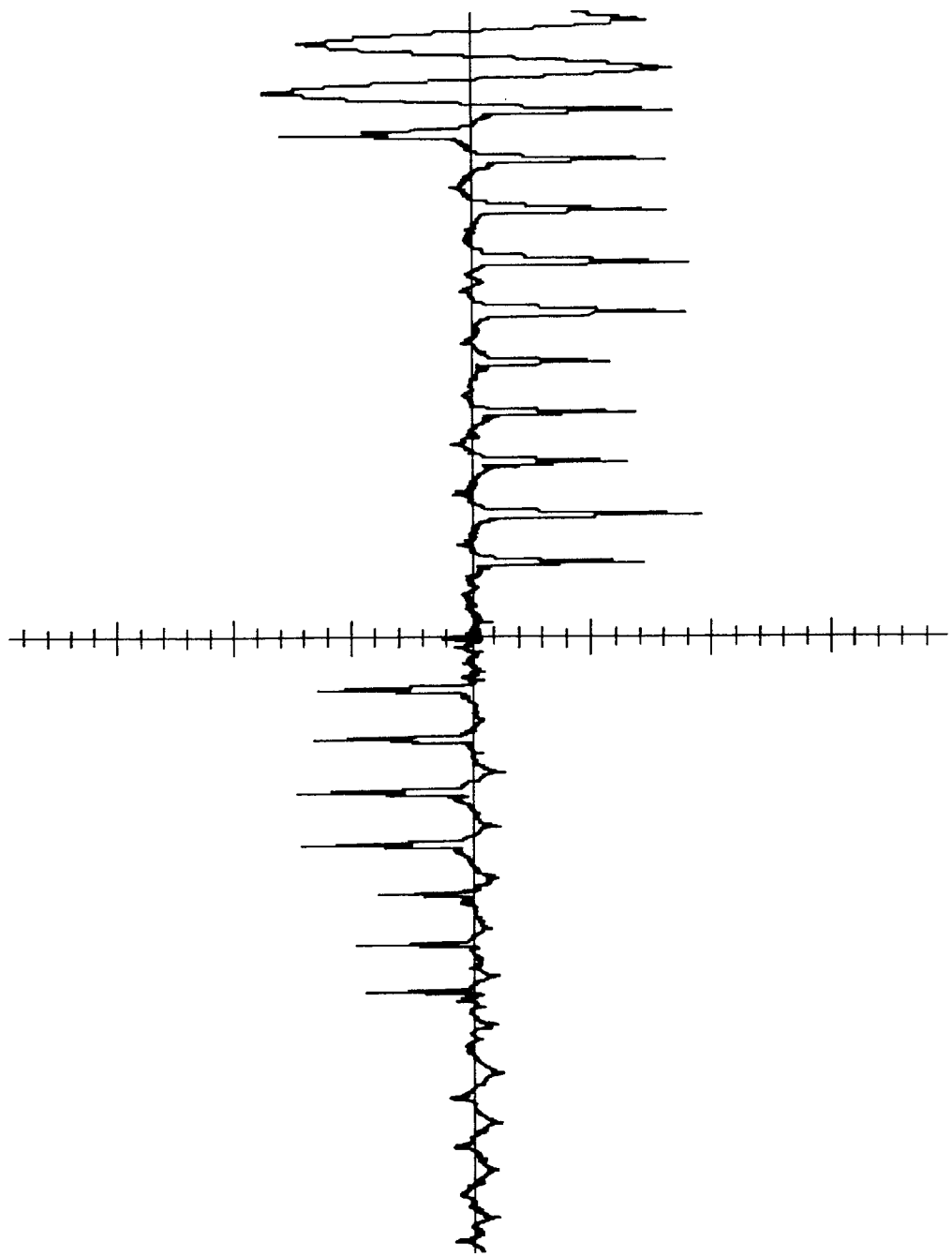
FIG. 11 is a graph showing a current waveform when cycles are switched in the copy mode.

The flickers measured therein are 0.93, 0.88, and 0.92, respectively, all of which are below the regulation limit of 1.0. A still another example modification is shown in FIG. 11.

Figure 12:
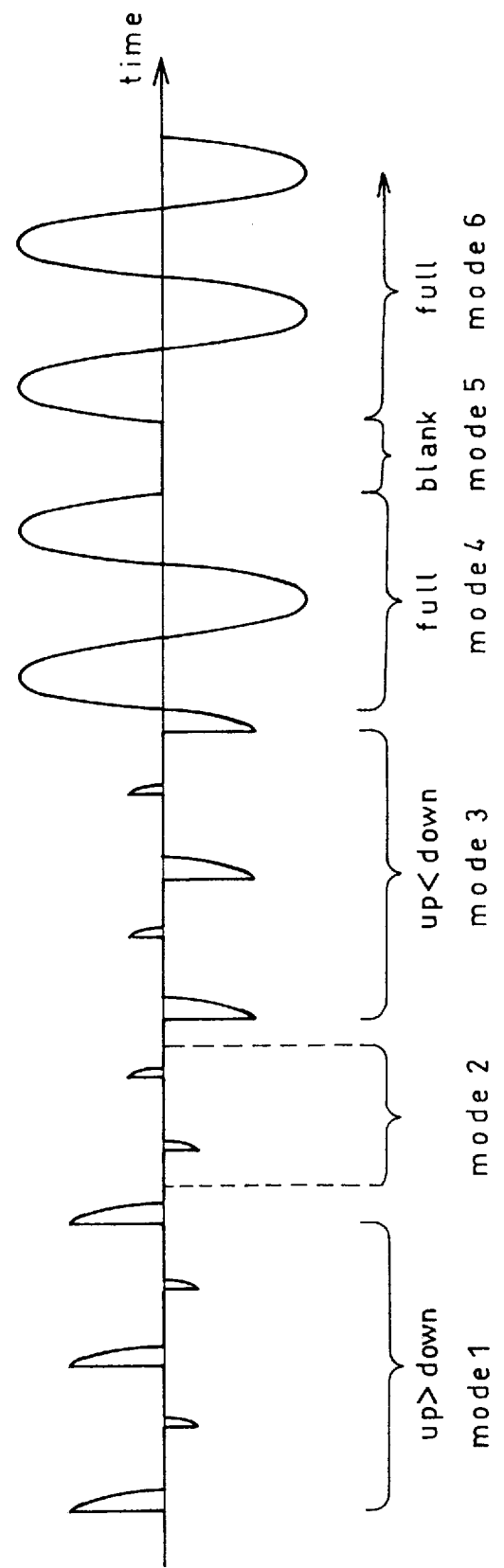
FIG. 12 is a view explaining a switching pattern in a period where a conduction amount of a first polarity is relatively large and another switching pattern in a period where a conduction amount of a second polarity is relatively large.

Yet still another example modification will be explained with reference to FIG. 12. Herein, the switching represented by modes 1 through 6 is carried out successively. In the mode 1, an up switched half cycle is greater than a down switched half cycle. In the mode 3, the down switched half cycle is greater than the up switched half cycle. In the mode 2, an up switched half cycle smaller than the up switched half cycle in the mode 1 is followed by a down switched half cycle smaller than the down switched half cycle in the mode 3. In each of the modes 4 and 6, a full cycle is given, and in the mode 5, a blank is given. A period of the mode 2 is at least one cycle, or can be one cycle sharp. The mode 2 may be omitted or an up & down switched half cycle may be inserted before the mode 4.

A still another example is illustrated in Table 9 below.

Figure 13:
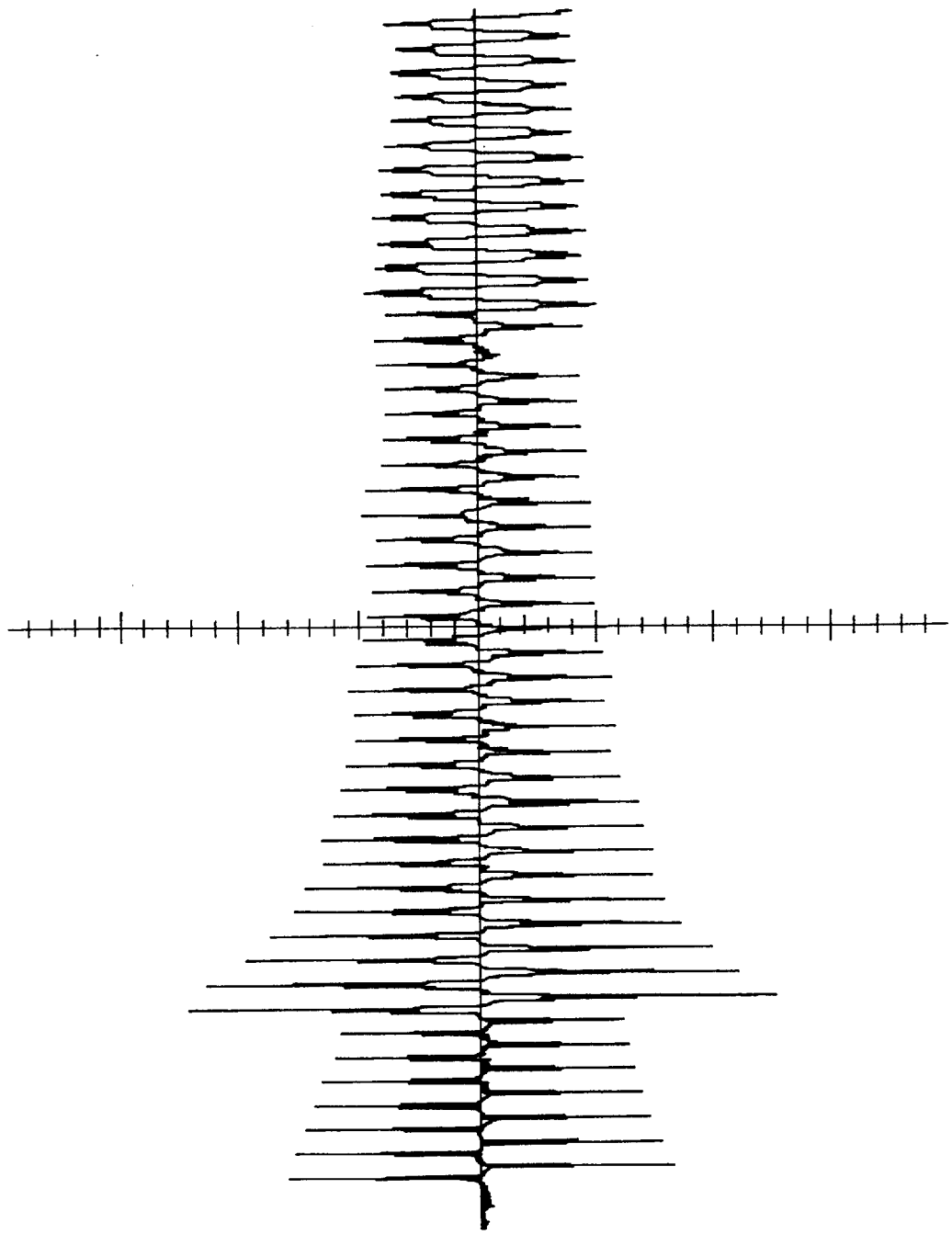
FIG. 13 is a graph showing a current waveform when cycles are switched to reduce a limit of a long flicker test.

The first row in Table 9 below and FIG. 13 show the switching pattern to reduce the long flicker. This type of switching can reduce the long flicker to as low as 0.53 with respect to the safety regulation limit of 0.65 as previously shown in Table 2 above. The above switching is composed of 14 switched half cycles with a short constant delay followed by 53 switched half cycles with a longer constant delay, and 3 switched half cycles which are same as those in the copy mode. The purpose of the first 14 switched half cycles is to reduce the long flickers below the safety regulation limit by securing two weak heating periods and a medium heating period.

Figure 14:
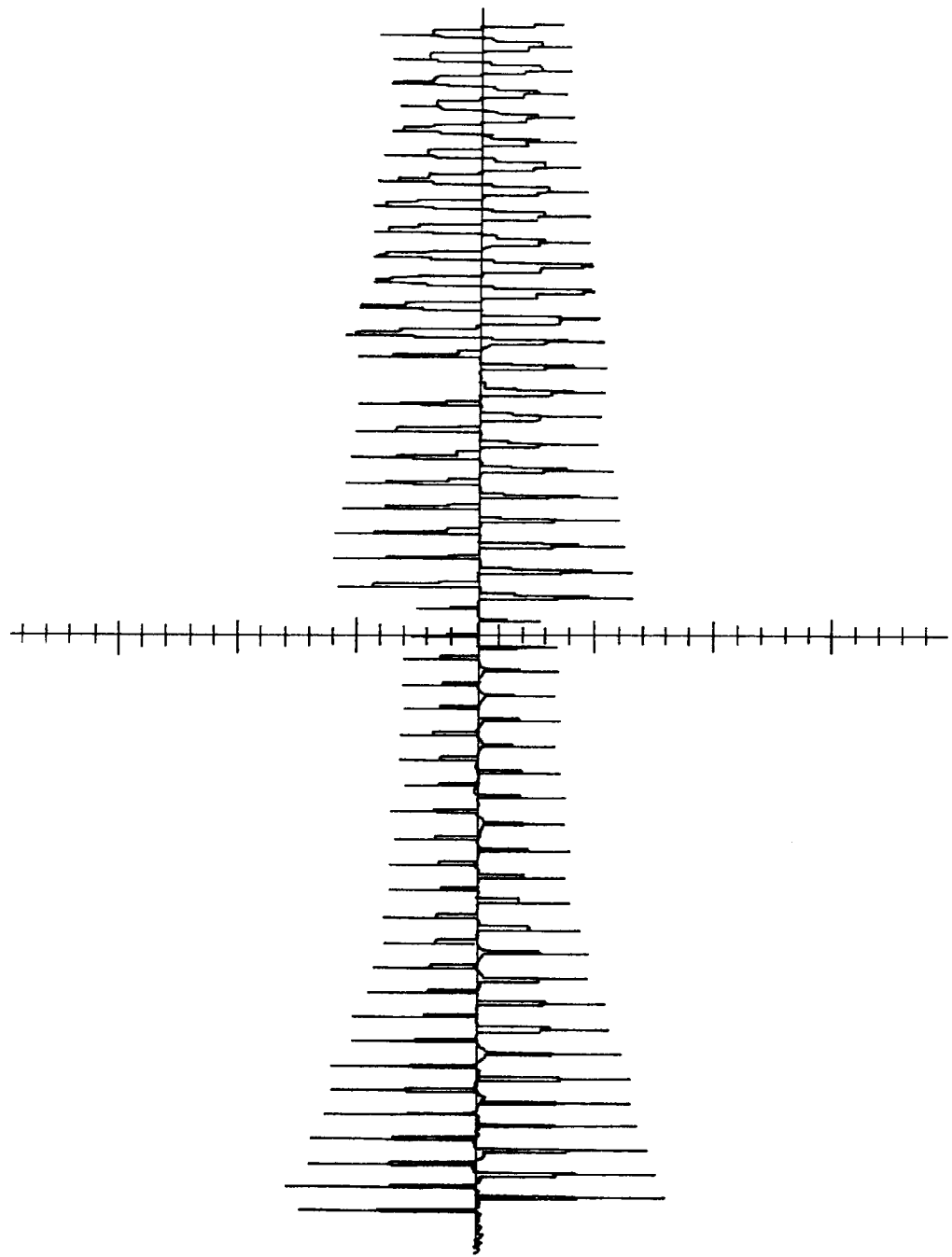
FIG. 14 is still another graph showing a current waveform when cycles are switched.

The waveform shaped by the switching pattern in the second row in Table 9 below is illustrated in FIG. 14.

TABLE 8

| SIGNAL TYPE | Half Cycles | Purpose | Long Flicker Level | Limit |
|---|---|---|---|---|
| 1 | 2 up (long delay) | reduce flicker & harmonics, soft heating | 0.93 | 1 |
| | 6 up (medium delay) | reduce flicker & harmonics, medium heating | | |
| | 2 blanks | separation of period | | |
| | 5 down (medium delay) | reduce flicker & harmonics, medium heating | | |
| | 3 down (small delay) | reduce flicker & harmonics, strong heating | | |
| | 3 up & down (small delay) | reduce flicker | | |
| | 3 up & down ZC | heating boost | | |
| 2 | 2 up (long delay) | reduce flicker & harmonics, soft heating | 0.88 | |
| | 6 up (medium delay) | reduce flicker & harmonics, medium heating | | |
| | 2 blanks | separation of period | | |
| | 5 down (medium delay) | reduce flicker & harmonics, medium heating | | |
| | 3 down (small delay) | reduce flicker & harmonics, strong heating | | |
| | 3 up & down (small delay) | reduce flicker | | |
| | 3 up & down ZC | heating boost | | |
| | blank | reduce flicker before ZC switching | | |
| 3 | 2 up (long delay) | reduce flicker & harmonics, soft heating | 0.92 | 1 |
| | 7 up (medium delay) | reduce flicker & harmonics, medium heating | | |
| | 2 blanks | separation of period | | |
| | 5 down (medium delay) | reduce flicker & harmonics, medium heating | | |
| | 3 down (small delay) | reduce flicker & harmonics, strong heating | | |
| | 3 up & down (small delay) | reduce flicker | | |
| | 3 up & down ZC | heating boost | | |

TABLE 9

| Signal Type | Half Cycles | Purpose | Long Flicker Level | Limit |
|---|---|---|---|---|
| 1 | 14 up & down (long delay) | reduce flicker, soft heating | 0.53 | 0.65 |
| | 53 up & down (medium delay) | reduce flicker, medium heating | | |
| | blank | separation of period | | |
| | 3 up & down (short delay) | reduce flicker before ZC switching | | |
| 2 | 49 up & down (long delay) | reduce flicker, soft heating | — | |
| | 17 up & down (medium delay) | reduce flicker, medium heating | | |
| | blank | separation of period | | |
| | 3 up & down (short delay) | reduce flicker before ZC switching | | |
| 3 | 90 up & down (medium delay) | reduce flicker before ZC switching | 0.75 | |

The conduction control to the load by the switching patterns in each Embodiment above starts with the upper half cycle. However, the conduction control may start with the lower half cycle instead.

Each Embodiment can be modified in various manners. For example, the conduction phase angle is controlled herein in such a manner that the conduction period is in the up switched half cycle and the conduction time is 2 ms. However, a conduction amount to the up switched half cycle only has to be relatively large with respect to a conduction amount to the down switched half cycle. In addition, the conduction to the down switched half cycles should not necessarily be prevented completely. Because the effect can be obtained only if the conduction amount to the up switched half cycle is made relatively large with respect to the conduction amount to the down switched half cycle.

Likewise, in case of zero conduction to the load, the conduction may not be reduced to 0 completely. For example, even when a slight amount of current passes through the load, the effect can be obtained only if substantially no power source is supplied to the heater lamp serving as the load. In addition, the switching is realized by the TRIAC and gate circuit herein. However, the power control unit is possibly modified to start the conduction at the zero crossing point and stops the conduction by controlling a certain gate circuit.

As can be understood from Table 8 above, the number of upper or lower half cycles can be either an odd or even number.

As has been explained, a first power control unit of the present invention, including a load having a positive resistance characteristic to a temperature and switching means both connected to a n AC power source in series to supply a power to said load by controlling said switching means, is characterized in that, (1) said switching means includes:
 a first control mode for continuously supplying a power which is composed of a plurality of half cycle switching waveforms of a first polarity to said load;
 a second control mode for continuously supplying a power which is composed of a plurality of half cycle switching waveforms of a second polarity to said load, said second polarity being different from said first polarity; and
 a third control mode for supplying a power of a half cycle of said first polarity and a power of a half cycle of said second polarity to said load in turn, and (2) said switching means operates in order of said first control mode, second control mode, and third control mode.

A second power control unit of the present invention, including a load having a positive resistance characteristic to a temperature and switching means both connected to an AC power source in series to supply a power to said load by controlling said switching means, is characterized in that, (1) said switching means includes:
 a first control mode for continuously supplying a power which is composed of a plurality of half cycle switching waveforms of a first polarity to said load;
 a second control mode for inhibiting a power supply to said load for at least one cycle of said AC power source continuously;
 a third control mode for continuously supplying a power which is composed of a plurality of half cycle switching waveforms of a second polarity to said load, said second polarity being different from said first polarity; and
 a fourth control mode for supplying a power of a half cycle of said first polarity and a power of a half cycle of said second polarity to said load in turn, and (2) said switching means operates in order of said first control mode, second control mode, third control mode, and fourth mode.

A third power control unit of the present invention is the second power control unit further characterized in that the power supply is prohibited for one cycle of said AC power source in said second control mode.

A fourth power control unit of the present invention, including a load having a positive resistance characteristic to a temperature and switching means both connected to an AC power source in series to supply a power to said load by controlling said switching means, is characterized in that, (1) said switching means includes:
 a first control mode for supplying a power to said load in such a manner that an amount of a power of a first polarity is relatively large with respect to an amount of a power of a second polarity for at least one cycle of said AC power source, said first and second polarities being different from each other;
 a second control mode for supplying a power to said load in such a manner that an amount of a power of said second polarity is relatively large with respect to an amount of a power of said first polarity for at least one cycle of said AC power source; and
 a third control mode for supplying a power of a half cycle of said first polarity and a power of a half cycle of said second polarity to said load in turn, and (2) said switching means operates in order of said first control mode, second control mode, and third control mode.

A fifth power control unit of the present invention, including a load having a positive resistance characteristic to a temperature and switching means both to an AC power source in series to supply a power to said load by controlling said switching means, is characterized in that, (1) said switching means includes:
 a first control mode for supplying a power to said load in such a manner that an amount of a power of a first polarity is relatively large with respect to an amount of a power of a second polarity for at least one cycle of said AC power source, said first and second polarities being different from each other;
 a third control mode for supplying a power to said load in such a manner that an amount of a power of said second polarity is relatively large with respect to an amount of a power of said first polarity for at least one cycle of said AC power source;
 a second control mode for supplying a power to said load in such a manner that an amount of a power of said first polarity is relatively small compared with an amount of the power supplied in said first control mode and an amount of a power of said second polarity is relatively small compared with an amount of the power supplied in said third control mode for at least one cycle of said AC power source; and
 a fourth control mode for supplying a power of a half cycle of said first polarity and a power of a half cycle of said second polarity to said load in turn, and (2) said switching means operates in order of said first control mode, second control mode, third control mode, and fourth control mode.

A sixth power control unit of the present invention is the fifth power control unit further characterized in that the amount of the power in said second mode is substantially 0 (nil).

A seventh power control unit of the present invention is the fifth or sixth power control unit further characterized in that the power is supplied for one cycle of said AC power source in said second mode.

An eighth power control unit of the present invention, including a load having a positive resistance characteristic to a temperature and switching means both connected to an AC power source in series to supply a power to said load by controlling said switching means, is characterized in that, (1) said switching means includes:
- a first control mode for supplying a power to said load in such a manner that an amount of a power of a first polarity is relatively large compared with an amount of a power of a second polarity for at least one cycle of said AC power source, said first and second polarities being different from each other;
- a second control mode for supplying a power to said load in such a manner that an amount of a power of said second polarity is relatively large with respect to an amount of a power of said first polarity for at least one cycle of said AC power source;
- a third control mode for successively supplying a switching control power of said second polarity, a switching control power of said first polarity, and the switching control power of said second polarity to said load in an order presented; and
- a fourth control mode for supplying a power of said first polarity and a power of said second polarity to said load in turn, and (2) said switching means operates in order of said first control mode, second control mode, third control mode, and fourth control mode.

A ninth power control unit of the present invention, including a load having a positive resistance characteristic to a temperature and switching means both connected to an AC power source in series to supply a power to said load by controlling said switching means, is characterized in that, (1) said switching means includes:
- a first control mode for supplying a power to said load in such a manner that an amount of a power of a first polarity is relatively large compared with an amount of a power of a second polarity for at least one cycle of said AC power source, said first and second polarity being different from each other;
- a second control mode for supplying a power to said load in such a manner that an amount of a power of said second polarity is relatively large compared with an amount of a power of said first polarity for at least one cycle of said AC power source;
- a third control mode for successively supplying a switching control power of said second polarity, a switching control power of said first polarity, and the switching control power of said second polarity to said load in an order presented;
- a fourth control mode for supplying a power of said first polarity, a power of second polarity, and the power of first polarity in an order presented in a total amount larger than an amount of the power supplied in said third control mode; and
- a fifth control mode for supplying a power of said first polarity and a power of said second polarity to said load in turn, and (2) said switching means operates in order of said first control mode, second control mode, third control mode, fourth control mode, and fifth control mode.

A tenth power control unit of the present invention, including a load having a positive resistance characteristic to a temperature and switching means both connected to an AC power source in series to supply a power to said load by controlling said switching means, is characterized in that, (1) said switching means includes:
- a first control mode for supplying a power to said load in such a manner that an amount of a power of a first polarity is relatively large compared with an amount of a power of a second polarity for at least one cycle of said AC power source, said first and second polarity being different from each other;
- a second control mode for supplying a power to said load in such a manner that an amount of a power of said second polarity is relatively large compared with an amount of a power of said first polarity for at least one cycle of said AC power source;
- a third control mode for successively supplying a switching control power of said second polarity, a switching control power of said first polarity, and the switching control power of said second polarity to said load in an order presented;
- a fourth control mode for successively supplying a half cycle power of said first polarity, a half cycle power of second polarity, and the half cycle power of first polarity in an order presented in a total amount larger than an amount of the power supplied in said third control mode to said load;
- a fifth control mode for supplying a power to said load in an amount smaller than an amount of the half cycle power in said fourth control mode for a half cycle of said AC power source; and
- a sixth control mode for supplying a power of said first polarity and a power of said second polarity to said load in turn, and (2) said switching means operates in order of said first control mode, second control mode, third control mode, fourth control mode, fifth control mode, and sixth control mode.

An eleventh power control unit of the present invention is the tenth power control unit further characterized in that the amount of the power supplied to said load in said fifth control mode is 0 (nil).

A twelfth power control unit of the present invention, including a load having a positive resistance characteristic to a temperature and switching means both connected to an AC power source in series to supply a power to said load by controlling said switching means, is characterized in that, (1) said switching means includes:
- a first control mode for supplying a power to said load in such a manner that an amount of conduction of a first polarity is relatively large with respect to an amount of conduction of a second polarity for at least a period twice as long as a half cycle of said power source, said first and second polarities being different from each other;
- a second control mode for supplying a power to said load in such a manner that an amount of conduction of said second polarity is relatively large with respect to an amount of conduction of said first polarity for at least a period twice as long as the half cycle of said power source;
- a third control mode for successively supplying a half cycle power of said first polarity, a half cycle power of said second polarity, and a half cycle of said first polarity to said load;
- a fourth control mode for supplying a power in an amount smaller than an amount of the half cycle power supplied in said third control mode to said load for a half cycle of said AC power source; and
- a fifth control mode for supplying a power of said first polarity and a power of said second polarity to said load in turn, and (2) said switching means operates in order of said first control mode, second control mode, third control mode, fourth control mode, and fifth control mode.

A thirteenth power control unit of the present invention is the twelfth power control unit further characterized in that the amount of the power supplied in said fourth mode is 0 (nil).

A fourteenth power control unit of the present invention, including a load having a positive resistance characteristic to a temperature and switching means both connected to an AC power source in series to supply a power to said load by controlling said switching means, is characterized in that, (1) said switching means includes:
 a first control mode for continuously supplying a first switching power to said load for at least one cycle of said AC power source;
 a second control mode for continuously supplying a second switching power to said load for at least one cycle of said AC power source; and
 a third control mode for supplying a power of said first polarity and a power of said second polarity to said load in turn, (2) a phase is set to effect switching in such a manner that an amount of a conduction current to said load for a first half cycle in said second mode is larger than an amount of the conduction current for a last half cycle in said first control mode, and (3) said switching means operates in order of said first control mode, second control mode, and third control mode.

For example, in FIG. 13, the first 14 up & down half cycles are the first control mode, and the following 53 up & down half cycles are the second control mode.

A fifteenth power control unit of the present invention, including a load having a positive resistance characteristic to a temperature and switching means both connected to an AC power source in series to supply a power to said load by controlling said switching means, is characterized in that, (1) said switching means includes:
 a first control mode for continuously supplying a first switching power to said load for at least one cycle of said AC power source;
 a second control mode for continuously supplying a second switching power to said load for at least one half cycle of said AC power source;
 a third control mode for continuously supplying a third switching power to said load for at least one cycle of said AC power source; and
 a fourth control mode for supplying a power of said first polarity and a power of said second polarity to said load in turn, (2) a phase is set to effect switching in such a manner that an amount of a conduction current to said load for each half cycle in said second control mode is smaller than both (i) an amount of the conduction current for a last half cycle in said first control mode and (ii) an amount of the conduction current to said load for a first half cycle in said third control mode, and (3) said switching means operates in order of said first control mode, second control mode, third control mode, and fourth control mode.

A sixteenth power control unit of the present invention is the fifteenth power control unit further characterized in that said switching means includes a period in which no switching power is supplied to said load between said first control mode and third control mode instead of said second control mode.

For example, in FIG. 13, the first 14+53 up & down half cycles are the first control mode, the following half cycle blank is the second control mode, and the following 3 up & down half cycles are the third control mode.

A seventeenth power control unit of the present invention is the fifteenth or sixteenth power control unit further characterized in that a period of said second control mode is as long as a half cycle of said AC power source.

An eighteenth power control unit of the present invention is the fifteenth, sixteenth, or seventeenth power control unit further characterized in that an amount of said first half cycle switching power in said third control mode is smaller than an amount of a power for a last half cycle in said first control mode.

A nineteenth power control unit of the present invention, including a load having a positive resistance characteristic to a temperature and switching means both connected to an AC power source in series to supply a power to said load by controlling said switching means, is characterized in that, (1) said switching means including:
 a first control mode for continuously supplying a first switching power to said load for at least one cycle of said AC power source;
 a second control mode for continuously supplying a second switching power to said load for at least one cycle of said AC power source; and
 a third control mode for supplying a power of a first polarity and a power of a second polarity to said load in turn, (2) a phase is set to effect switching in said first and second control modes in such a manner that a conduction phase to said load is smaller in said second control mode than in said first control mode, and (3) said switching means operates in order of said first control mode, second control mode, and third control mode.

According to the above arrangements, it has become possible to attain an effect that not only odd harmonics, but also the flickers generated by a rush current can be reduced by supplying a plurality of half cycle switching waveforms of the first polarity and a plurality of half cycle switching waveforms of the second polarity to the load having a positive characteristic to heat.

In other words, four following effects can be attained:
(1) reducing the harmonic noises without using an expensive noise filter;
(2) reducing the flickers by suppressing a rush current flowing in the heater lamp;
(3) providing a switching pattern such that maintains the flickers and harmonic noises within their respective safety regulation limits; and
(4) providing a switching method without adding any special hardware circuit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power control unit including a load having a positive resistance characteristic to a temperature and switching means both connected to an AC power source in series to supply a power to said load by controlling said switching means, wherein, (1) said switching means includes:
 a first control mode for continuously supplying a power which is composed of a plurality of half cycle switching waveforms of a first polarity to said load;

a second control mode for continuously supplying a power which is composed of a plurality of half cycle switching waveforms of a second polarity to said load, said second polarity being different from said first polarity; and a third control mode for supplying a power of a half cycle of said first polarity and a power of a half cycle of said second polarity to said load in turn, and (2) said switching means operates in order of said first control mode, second control mode, and third control mode.

2. A power control unit including a load having a positive resistance characteristic to a temperature and switching means both connected to an AC power source in series to supply a power to said load by controlling said switching means, wherein, (1) said switching means includes:
   a first control mode for continuously supplying a power which is composed of a plurality of half cycle switching waveforms of a first polarity to said load;
   a second control mode for inhibiting a power supply to said load for at least one cycle of said AC power source continuously;
   a third control mode for continuously supplying a power which is composed of a plurality of half cycle switching waveforms of a second polarity to said load, said second polarity being different from said first polarity; and
   a fourth control mode for supplying a power of a half cycle of said first polarity and a power of a half cycle of said second polarity to said load in turn, and (2) said switching means operates in order of said first control mode, second control mode, third control mode, and fourth mode.

3. The power control unit of claim 2, wherein the power supply is prohibited for one cycle of said AC power source in said second control mode.

4. A power control unit including a load having a positive resistance characteristic to a temperature and switching means both connected to an AC power source in series to supply a power to said load by controlling said switching means, wherein, (1) said switching means includes:
   a first control mode for supplying a power to said load in such a manner that an amount of a power of a first polarity is relatively large with respect to an amount of a power of a second polarity for at least one cycle of said AC power source, said first and second polarities being different from each other;
   a second control mode for supplying a power to said load in such a manner that an amount of a power of said second polarity is relatively large with respect to an amount of a power of said first polarity for at least one cycle of said AC power source; and
   a third control mode for supplying a power of a half cycle of said first polarity and a power of a half cycle of said second polarity to said load in turn, and (2) said switching means operates in order of said first control mode, second control mode, and third control mode.

5. A power control unit including a load having a positive resistance characteristic to a temperature and switching means both to an AC power source in series to supply a power to said load by controlling said switching means, wherein, (1) said switching means includes:
   a first control mode for supplying a power to said load in such a manner that an amount of a power of a first polarity is relatively large with respect to an amount of a power of a second polarity for at least one cycle of said AC power source, said first and second polarities being different from each other;
   a third control mode for supplying a power to said load in such a manner that an amount of a power of said second polarity is relatively large with respect to an amount of a power of said first polarity for at least one cycle of said AC power source;
   a second control mode for supplying a power to said load in such a manner that an amount of a power of said first polarity is relatively small compared with an amount of the power supplied in said first control mode and an amount of a power of said second polarity is relatively small compared with an amount of the power supplied in said third control mode for at least one cycle of said AC power source; and
   a fourth control mode for supplying a power of a half cycle of said first polarity and a power of a half cycle of said second polarity to said load in turn, and (2) said switching means operates in order of said first control mode, second control mode, third control mode, and fourth control mode.

6. The power control unit of claim 5, wherein the amount of the power in said second mode is substantially 0 (nil).

7. The power control unit of claim 5, wherein the power is supplied for one cycle of said AC power source in said second mode.

8. A power control unit including a load having a positive resistance characteristic to a temperature and switching means both connected to an AC power source in series to supply a power to said load by controlling said switching means, wherein, (1) said switching means includes:
   a first control mode for supplying a power to said load in such a manner that an amount of a power of a first polarity is relatively large compared with an amount of a power of a second polarity for at least one cycle of said AC power source, said first and second polarities being different from each other;
   a second control mode for supplying a power to said load in such a manner that an amount of a power of said second polarity is relatively large with respect to an amount of a power of said first polarity for at least one cycle of said AC power source;
   a third control mode for successively supplying a switching control power of said second polarity, a switching control power of said first polarity, and the switching control power of said second polarity to said load in an order presented; and
   a fourth control mode for supplying a power of said first polarity and a power of said second polarity to said load in turn, and (2) said switching means operates in order of said first control mode, second control mode, third control mode, and fourth control mode.

9. A power control unit including a load having a positive resistance characteristic to a temperature and switching means both connected to an AC power source in series to supply a power to said load by controlling said switching means, wherein, (1) said switching means includes:
   a first control mode for supplying a power to said load in such a manner that an amount of a power of a first polarity is relatively large compared with an amount of a power of a second polarity for at least one cycle of said AC power source, said first and second polarity being different from each other;

a second control mode for supplying a power to said load in such a manner that an amount of a power of said second polarity is relatively large compared with an amount of a power of said first polarity for at least one cycle of said AC power source;

a third control mode for successively supplying a switching control power of said second polarity, a switching control power of said first polarity, and the switching control power of said second polarity to said load in an order presented;

a fourth control mode for supplying a power of said first polarity, a power of second polarity, and the power of first polarity in an order presented in a total amount larger than an amount of the power supplied in said third control mode; and a fifth control mode for supplying a power of said first polarity and a power of said second polarity to said load in turn, and (2) said switching means operates in order of said first control mode, second control mode, third control mode, fourth control mode, and fifth control mode.

10. A power control unit including a load having a positive resistance characteristic to a temperature and switching means both connected to an AC power source in series to supply a power to said load by controlling said switching means, wherein, (1) said switching means includes:

a first control mode for supplying a power to said load in such a manner that an amount of a power of a first polarity is relatively large compared with an amount of a power of a second polarity for at least one cycle of said AC power source, said first and second polarity being different from each other;

a second control mode for supplying a power to said load in such a manner that an amount of a power of said second polarity is relatively large compared with an amount of a power of said first polarity for at least one cycle of said AC power source;

a third control mode for successively supplying a switching control power of said second polarity, a switching control power of said first polarity, and the switching control power of said second polarity to said load in an order presented;

a fourth control mode for successively supplying a half cycle power of said first polarity, a half cycle power of second polarity, and the half cycle power of first polarity in an order presented in a total amount larger than an amount of the power supplied in said third control mode to said load;

a fifth control mode for supplying a power to said load in an amount smaller than an amount of the half cycle power in said fourth control mode for a half cycle of said AC power source; and a sixth control mode for supplying a power of said first polarity and a power of said second polarity to said load in turn, and (2) said switching means operates in order of said first control mode, second control mode, third control mode, fourth control mode, fifth control mode, and sixth control mode.

11. The power control unit of claim 10, wherein the amount of the power supplied to said load in said fifth control mode is 0 (nil).

12. A power control unit including a load having a positive resistance characteristic to a temperature and switching means both connected to an AC power source in series to supply a power to said load by controlling said switching means, wherein, (1) said switching means includes:

a first control mode for supplying a power to said load in such a manner that an amount of conduction of a first polarity is relatively large with respect to an amount of conduction of a second polarity for at least a period twice as long as a half cycle of said power source, said first and second polarities being different from each other;

a second control mode for supplying a power to said load in such a manner that an amount of conduction of said second polarity is relatively large with respect to an amount of conduction of said first polarity for at least a period twice as long as the half cycle of said power source;

a third control mode for successively supplying a half cycle power of said first polarity, a half cycle power of said second polarity, and a half cycle of said first polarity to said load;

a fourth control mode for supplying a power in an amount smaller than an amount of the half cycle power supplied in said third control mode to said load for a half cycle of said AC power source; and a fifth control mode for supplying a power of said first polarity and a power of said second polarity to said load in turn, and (2) said switching means operates in order of said first control mode, second control mode, third control mode, fourth control mode, and fifth control mode.

13. The power control unit of claim 12, wherein the amount of the power supplied in said fourth mode is 0 (nil).

14. A power control unit including a load having a positive resistance characteristic to a temperature and switching means both connected to an AC power source in series to supply a power to said load by controlling said switching means, wherein, (1) said switching means includes:

a first control mode for continuously supplying a first switching power to said load for at least one cycle of said AC power source;

a second control mode for continuously supplying a second switching power to said load for at least one cycle of said AC power source; and a third control mode for supplying a power of a first polarity and a power of a second polarity to said load in turn, (2) a phase is set to effect switching in such a manner that an amount of a conduction current to said load for a first half cycle in said second mode is larger than an amount of the conduction current for a last half cycle in said first control mode, and (3) said switching means operates in order of said first control mode, second control mode, and third control mode.

15. A power control unit including a load having a positive resistance characteristic to a temperature and switching means both connected to an AC power source in series to supply a power to said load by controlling said switching means, wherein, (1) said switching means includes:

a first control mode for continuously supplying a first switching power to said load for at least one cycle of said AC power source;

a second control mode for continuously supplying a second switching power to said load for at least one half cycle of said AC power source;

a third control mode for continuously supplying a third switching power to said load for at least one cycle of said AC power source; and a fourth control mode for supplying a power of a first polarity and a power of a second polarity to said load in turn, (2) a phase is set to effect switching in such a manner that an amount of a conduction current to said load for each half cycle in said second control mode is smaller than both (i) an amount of the conduction current for a last half cycle in said first control mode and (ii) an amount of the conduction current to said load for a first half cycle in said third control mode, and (3) said switching means operates in order of said first control mode, second control mode, third control mode, and fourth control mode.

16. The power control unit of claim 15, wherein said switching means includes a period in which no switching power is supplied to said load between said first control mode and third control mode instead of said second control mode.

17. The power control unit of claim 16, wherein a period of said second control mode is as long as a half cycle of said AC power source.

18. The power control unit of claim 16, wherein an amount of said first half cycle switching power in said third control mode is smaller than an amount of a power for a last half cycle in said first control mode.

19. The power control unit of claim 15, wherein a period of said second control mode is as long as a half cycle of said AC power source.

20. The power control unit of claim 19, wherein an amount of said first half cycle switching power in said third control mode is smaller than an amount of a power for a last half cycle in said first control mode.

21. The power control unit in claim 15, wherein an amount of said first half cycle switching power in said third control mode is smaller than an amount of a power for a last half cycle in said first control mode.

22. A power control unit including a load having a positive resistance characteristic to a temperature and switching means both connected to an AC power source in series to supply a power to said load by controlling said switching means, wherein (1) said switching means including:

a first control mode for continuously supplying a first switching power to said load for at least one cycle of said AC power source;

a second control mode for continuously supplying a second switching power to said load for at least one cycle of said AC power source; and a third control mode for supplying a power of a first polarity and a power of a second polarity to said load in turn, (2) a phase is set to effect switching in said first and second control modes in such a manner that a conduction phase to said load is smaller in said second control mode than in said first control mode, and (3) said switching means operates in order of said first control mode, second control mode, and third control mode.

* * * * *